US012159550B2

(12) United States Patent
Henschel et al.

(10) Patent No.: US 12,159,550 B2
(45) Date of Patent: Dec. 3, 2024

(54) COMPACT HAPTIC MIXED REALITY SIMULATOR

(71) Applicant: VIRTAMED AG, Schlieren (CH)

(72) Inventors: Christopher Henschel, Schlieren (CH); Ivo Leibacher, Schlieren (CH); Daniel Chofen, Schlieren (CH); Stefan Tuschschmid, Schlieren (CH); Markus Oelhafen, Schlieren (CH); Carolyn Mattes-O'brien, Schlieren (CH)

(73) Assignee: VIRTAMED AG, Schlieren (CH)

( * ) Notice: Subject to any disclaimer, the term of this patent is extended or adjusted under 35 U.S.C. 154(b) by 437 days.

(21) Appl. No.: 17/431,053

(22) PCT Filed: Jan. 13, 2020

(86) PCT No.: PCT/EP2020/050731
§ 371 (c)(1),
(2) Date: Aug. 13, 2021

(87) PCT Pub. No.: WO2020/164829
PCT Pub. Date: Aug. 20, 2020

(65) Prior Publication Data
US 2022/0139260 A1 May 5, 2022

(30) Foreign Application Priority Data

Feb. 15, 2019 (EP) .................................. 19157591

(51) Int. Cl.
*G09B 23/28* (2006.01)
*G06F 3/01* (2006.01)

(52) U.S. Cl.
CPC ............ *G09B 23/285* (2013.01); *G06F 3/011* (2013.01); *G06F 3/016* (2013.01)

(58) Field of Classification Search
CPC ........ G09B 23/285; G06F 3/011; G06F 3/016
See application file for complete search history.

(56) References Cited

U.S. PATENT DOCUMENTS

| 5,769,640 A * | 6/1998 | Jacobus ............... G09B 23/285 |
| | | 434/262 |
| 7,780,451 B2 * | 8/2010 | Willobee ............... G09B 23/32 |
| | | 434/267 |

(Continued)

FOREIGN PATENT DOCUMENTS

| EP | 1609431 | 12/2005 | |
| EP | 1609431 A1 * | 12/2005 | ............. A61B 90/36 |

(Continued)

OTHER PUBLICATIONS

International Search Report issued in Application No. PCT/EP2020/050731 dated Apr. 2, 2020.

(Continued)

*Primary Examiner* — Xuan M Thai
*Assistant Examiner* — Sadaruz Zaman
(74) *Attorney, Agent, or Firm* — DLA Piper LLP (US)

(57) ABSTRACT

A compact and versatile mixed reality simulator system and methods may comprise a mixed reality processing engine and a haptic control engine to control a linear electromagnetic motor (LEM) of 1 degree of freedom made of a handheld instrument replicate and a trocar-like instrument hosting duct. The compact and versatile mixed reality simulator system may comprise multiple interchangeable instrument hosting ducts and handheld instrument replicates and the mixed reality processing engine may automatically detect, from sensors, which instrument replicate has been inserted in which duct. The mixed reality processing engine may detect a virtual contact between the handheld instrument replicate and a virtual object in a mixed reality scenario. The mixed reality processing engine may calculate with a real-time solver the kinesthetic force feedback signal to power the LEM as a function of the position and orientation of the instrument tracked from sensors, and of the position, orientation and material property of the virtual (Continued)

object as it deforms due to the virtual contact according to the mixed reality scenario. The mixed reality processing engine may adapt in real¬ time the haptic feedback by resealing its magnitude, and/or combining it with a vibration signal, possibly with an additional vibrotactile actuator arrangement. The mixed reality processing engine may jointly adapt the haptic feedback signal and the virtual reality scene rendering for a more realistic mixed reality experience with a haptic retargeting method such as space warping.

15 Claims, 12 Drawing Sheets

(56) References Cited

U.S. PATENT DOCUMENTS

| | | | | |
|---|---|---|---|---|
| 8,992,230 | B2 * | 3/2015 | Tuchschmid | G09B 23/28 |
| | | | | 434/262 |
| 9,330,502 | B2 * | 5/2016 | Tuchschmid | G09B 23/30 |
| 10,180,572 | B2 * | 1/2019 | Osterhout | G06Q 30/02 |
| 10,416,767 | B2 * | 9/2019 | Nakamura | A63F 13/285 |
| 10,539,787 | B2 * | 1/2020 | Haddick | G06F 3/0428 |
| 10,559,226 | B2 * | 2/2020 | Valeev | G09B 23/28 |
| 10,813,742 | B2 * | 10/2020 | Adams | A61B 17/3423 |
| 10,838,497 | B2 * | 11/2020 | Nakamura | G06F 3/016 |
| 10,936,074 | B2 * | 3/2021 | Nakamura | G06F 3/017 |
| 10,948,989 | B1 * | 3/2021 | Blumenschein | G06F 3/011 |
| 11,127,306 | B2 * | 9/2021 | Goel | G06F 3/016 |
| 11,263,923 | B2 * | 3/2022 | Kumar | G09B 23/285 |
| 2005/0135824 | A1 * | 6/2005 | Shi | G03G 15/0266 |
| | | | | 399/50 |
| 2005/0202384 | A1 | 9/2005 | DiCuccio et al. | |
| 2005/0288740 | A1 * | 12/2005 | Hassler, Jr. | A61N 1/37223 |
| | | | | 607/61 |
| 2007/0275359 | A1 | 11/2007 | Rotnes et al. | |
| 2010/0063788 | A1 | 3/2010 | Brown et al. | |
| 2011/0091855 | A1 | 4/2011 | Miyazaki | |
| 2017/0004732 | A1 * | 1/2017 | Valeev | G09B 23/28 |
| 2017/0250358 | A1 | 8/2017 | Martin et al. | |
| 2017/0287361 | A1 * | 10/2017 | Caron | G09B 23/28 |
| 2017/0287362 | A1 * | 10/2017 | Caron | G09B 5/02 |
| 2017/0300111 | A1 * | 10/2017 | Price | G09B 23/34 |
| 2020/0261072 | A1 * | 8/2020 | Beaulier | A61B 17/00234 |
| 2021/0233429 | A1 * | 7/2021 | Barber | G09B 23/285 |
| 2022/0093008 | A1 * | 3/2022 | Nicolosi | G09B 23/285 |
| 2022/0139260 | A1 * | 5/2022 | Henschel | G06F 3/011 |
| 2022/0354579 | A1 * | 11/2022 | Dyer | A61B 34/25 |
| 2024/0029367 | A1 * | 1/2024 | Golenberg | G16H 30/40 |

FOREIGN PATENT DOCUMENTS

| | | | | |
|---|---|---|---|---|
| EP | 3046093 | | 7/2016 | |
| RU | 2546406 C1 * | | 4/2015 | G09B 19/24 |
| WO | WO-2005016928 A1 * | | 2/2005 | C07D 471/04 |
| WO | WO 2007/112486 | | 10/2007 | |
| WO | WO2011/046606 | | 4/2011 | |

OTHER PUBLICATIONS

Written Opinion issued in Application No. PCT/EP2020/050731 dated Apr. 2, 2020.
Ferzli, George S. "Laparoscopic trocar placement", 2011—retrieved from https://www.slideshare.net/drferzli/laparoscopic-trocar-placement, pp. 40, (Jun. 2018).
Correa et al. "Haptic interaction for needle insertion training in medical applications: The state-of-the-art", Medical Engineering and Physics, vol. 63, pp. 6-25, (2019).
K.H. Kramp et al. "Ergonomic assessment of the French and American position for laparoscopic cholecystectomy in the MIS Suite", Surg Endosc 28: pp. 1571-1578—DOI 10.1007/s00464-013-3353-1, (2014).
Okamura et al., "Reality-based models for vibration feedback in virtual environments", IEEE/SME Transactions on Mechatronics, vol. 6, No. 3, pp. 245-252, (Sep. 2001).
Kuchenbecker et al. "Improving contact realism through event-based haptic feedback", IEEE Trans. on Visualization and Computer Graphics, vol. 12, No. 2, pp. 219-230, (Mar./Apr. 2006).
Medtronic, Single Incision and Transanal Surgery, URL: http://www.medtronic.com/covidien/en-us/products/trocars-access/single-incision-transanal-surgery.html, pp. 3, (retrieve May 6, 2022).
Culbertson et al., "Haptics: the present and future of artificial touch sensation", Annual Review of Control, Robotics and Autonomous Systems, pp. 25, (Jan. 29, 2018).
Lapsim, URL: https://surgicalscience.com/systems/lapsim/, pp. 18, (retrieved on May 6, 2022).
CAE LapVR, URL: https://caehealthcare.com/surgical-simulation/lapvr.
Surgical Science, URL: http://simbionix.com/simulators/lap-mentor/platforms/, pp. 2.
EIDOS, "Product Catalog", URL: http://eidos-medicine.com/en/pdfs/EIDOS_Product Catalogue. pdf, pp. 38, (2018).
The Chamberlain Group, https://www.thecgroup.com/product/ast-advanced-laparoscopic-hernia-skin-2140/, pp. 3, (2020).
Limbs&things, Product No. 60000, Abdominal Examination Trainer, URL: https://www.limbsandthings.com/global/our-products/details/abdominal-examination-trainer, pp. 6.
The Chamberlin Group, "Insufflated Abdomen", pp. 3, (2020).

* cited by examiner

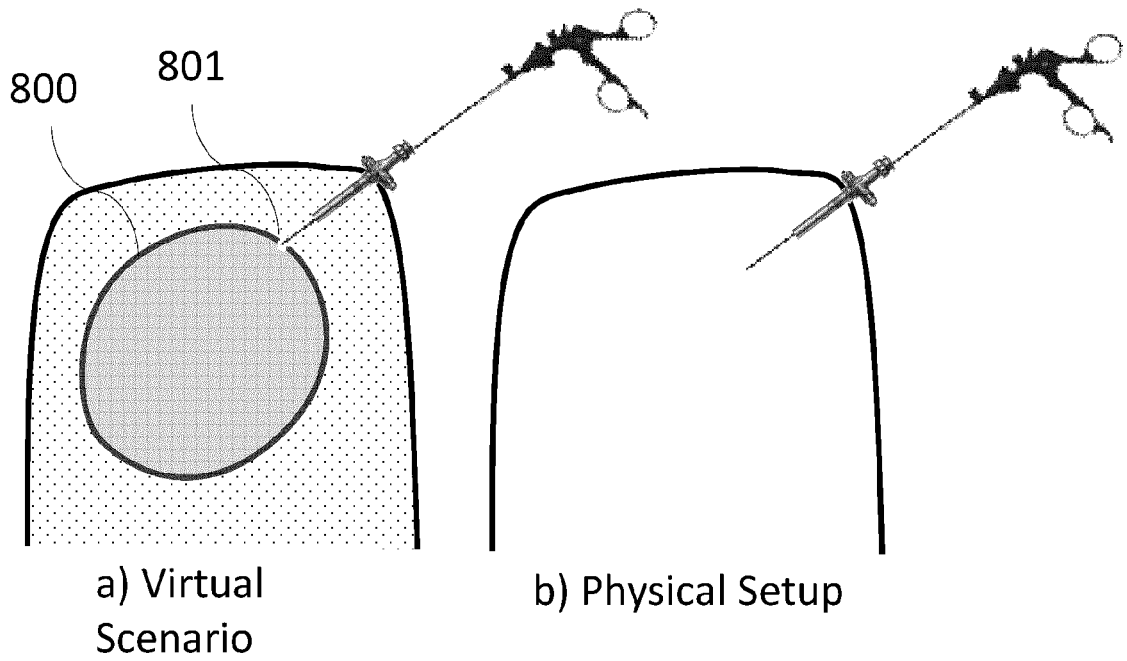
a) Virtual Scenario
b) Physical Setup
FIG. 8
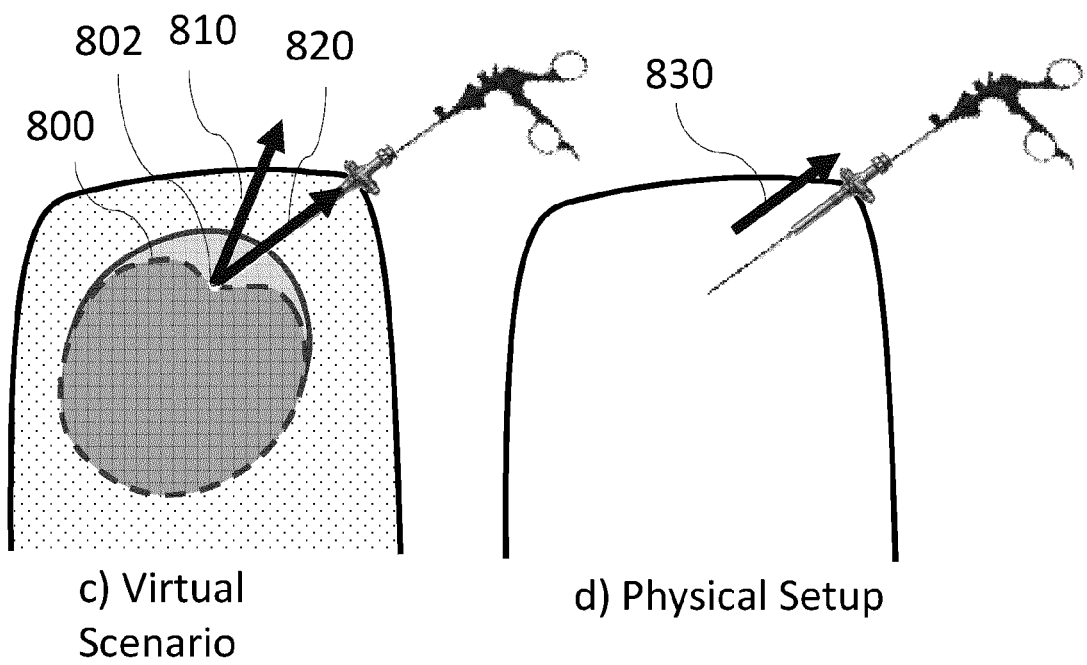
c) Virtual Scenario
d) Physical Setup

COMPACT HAPTIC MIXED REALITY SIMULATOR

CROSS REFERENCE TO RELATED APPLICATIONS

This application is a U.S. National Stage Application of International Application No. PCT/EP2020/050731 filed Jan. 13, 2020, which claims priority from European Patent Application No. 19157591.9 filed Feb. 15, 2019. The entirety of all the above-listed applications are incorporated herein by reference.

FIELD

The present invention relates to medical simulators, virtual reality and augmented reality simulation methods and systems in general, and more specifically to laparoscopy and other endoscopy simulators for surgical training purposes.

BACKGROUND

Medical Simulation

Medical imaging has become more and more used for both diagnostic and guidance during therapeutic procedures in a number of medical applications, such as endoscopy, arthroscopy, laparoscopy and other minimally invasive surgery applications. These new techniques require dedicated training for physicians and surgeons to master the indirect hand-eye coordination required by the manipulation of the imaging tools, such as an endoscope or an ultrasound probe, in addition to the conventional medical instruments and procedures for a diversity of patient anatomies as may be encountered in medical practice. Computerized medical training simulators may enable the physicians and trainees to develop and improve their practice in a virtual reality environment before actually practicing in the operation room.

Advanced medical procedure simulators may be based on a mixed- or virtual reality/augmented reality (VR/AR) simulation apparatus by which the physician can experiment a medical procedure scenario. The VR/AR system may compute and render, with a mixed reality processing engine (MRPE), a visual VR/AR model of anatomical structures in accordance with physician gestures and actions to provide various feedback, such as visual, haptic and audio feedback. In a VR system, an entire image may be simulated for display to a user, and in an AR system, a simulated image may be overlaid or otherwise incorporated with an actual image for display to a user. More generally, in a mixed reality system, a combination of real (for instance a physical object replica) and virtual elements (for instance computer graphics generated images) may be employed to increase the training scenario simulation realism. In a medical application, various patient models with different pathologies can be simulated. Therefore, natural variations as encountered over the years by practicing doctors can be simulated for a user over a compressed period of time for training purposes. The medical simulation procedure can be recorded and rehearsed for evaluation purpose. The VR/AR simulation system can also compute and provide various metrics and statistics.

VR/AR simulation systems such as the one described in U.S. Pat. No. 8,992,230 include a human anatomy model in real size. The VR/AR simulation system may further comprise a medical instrument to be handheld by the user to more realistically simulate the medical procedure. A passive feedback VR/AR simulation system such as for instance the one described in U.S. Pat. No. 8,992,230 may also be used with a diversity of medical procedure training scenarios, some of which may possibly result in a mismatch between an anatomy model surface as touched by the trainee and a virtual environment surface as computed by the VR/AR simulation system and rendered on the screen. In order to further improve the haptic experience and increase the realism in such medical training scenarios, the VR/AR simulation system may be further adapted with redirected touching, haptic retargeting or space warping methods and systems, as described for instance in U.S. Pat. No. 9,330,502.

Laparoscopy Simulators

In general, maximizing the realism of interacting with the physical anatomy model (mannequin) with medical tools or instruments directly adapted from the real medical practice may further improve the learning experience. In laparoscopy procedures, surgeons manipulate various instruments such as laparoscopes, scissors, forceps, graspers, hooks, probes, knot pushers, needle holders and others, which are guided into the patient body through trocars inserted into predefined ports (or portals) placed on the abdomen wall of the patient according to the pathology. Examples of laparoscopic instruments include the Medtronic Lapro-Clip™ ligation system, the Endo Clip™ single use clip applier, the Endo Clip™ pistol grip single use clip applier, the Covidien AutoSuture ProTack Fixation and Stapler devices, the Medtronic Endo Retract™ and Peanut™ single use instruments, the Medtronic ReliaCatch™, Endo Catch™ and Endo Bag™ retrieval solutions, the Ethicon Ligamax® and Ligaclip® single or multiple clip appliers, the Karl Storz Endoskope and Hopkins® Telescopes video imaging instruments, the Karl Storz dissecting and grasping forceps, palpation probes, retractors, dissectors and extractors, scissors, punches and forceps for biopsy, handles and instruments for suction and irrigation, as listed for instance in the online catalogue of products for laparoscopy in surgery, gynecology and urology from Karl Storz (www.karlstorz.com) and others. A trocar typically comprises a cannula as a hollow tube, an obturator, and a seal. Examples of trocar instruments with different diameters and lengths for various laparoscopy surgical procedures include the Ethicon ENDOPATH XCEL™ series, the Medtronic VersaOne™ series, the Karl Storz trocars, and others. Examples of the placement of 3 to 6 portals in different quadrants of the abdominal anatomy for different surgical procedures can be found for instance in Laparoscopic trocar placement, Presentation by Dr George S. Ferzli, 2011 retrieved from https://www.slideshare.net/drferzli/laparoscopic-trocar-placement, June 2018.

Mis-manipulation of the instruments or the trocars may lead to significant medical complications, for instance by perforating the bowels or large blood vessels, hence the importance of properly training the surgeons in charge with practicing those procedures. To this end, passive haptic anatomy simulators such as the Limbs & Things Surgical Female Pelvic Trainer (SFPT) have been developed, reproducing a standard anatomy organ arrangement based on a latex model. A limited range of laparoscopic gynecological surgical techniques and procedures may be simulated, also possibly with real instruments, but the simulation remains limited to standard anatomy scenarios and it is not possible to mimic the touch and feel sensing of standard surgical processes such as cutting with scissor instruments for tissue or organ grasping or removal. These setups indeed require additional hardware and/or disposables when cutting any anatomy model subpart, and/or to teach anatomic variations.

They do not enable to simulate the whole range of possible medical complications, and generally suffer from an unrealistic look and manipulation.

An exemplary manipulation for which significant training is required is the needle insertion, as practiced in the laparoscopy procedure suture stage. A worldwide state-of-the-art review of 145 related academic works, most of which based on VR/AR systems, has been recently compiled by Correa et al. in *Haptic interaction for needle insertion training in medical applications: The state-of-the-art*, Medical Engineering and Physics 63 (2019) 6-25. Correa observed that most of those works employed a commercial haptic device such as the Phantom Omni, the Phantom Premium or the Novint Falcon devices. While this enabled the researchers to focus on certain areas of research such as the development of robust and realistic mathematical models and haptic force feedback control methods suitable for real-time computer simulation, Correa et al. pointed out that the development of dedicated hardware remains a challenge for the research community, in particular in the ergonomic aspect of those devices. Indeed, most haptic devices have coupled arms, which are not found in real medical procedure practice with handheld instruments such as laparoscopy. The simulators embedding commercial haptic devices therefore tend to be bulky and require engineering expertise to setup, operate and maintain, which may not be desirable in a medical training environment out of the academic world. Correa et al. also indicated that while most commercial haptic devices work with at least 3DOF (Degrees-Of-Freedom), simplified systems may operate with lower degrees of freedom (down to one single axis of force feedback), yet with lower realism. Last but not least, most academic works have focused on a single haptic modality, such as the kinesthetic force feedback models and methods, while Correa et al. envision that exploring multimodal sensory perception evaluations (e.g. a combination of haptic and/or visual and/or auditory feedback) may lead to the design of improved systems.

Commercial VR-based prior art laparoscopy simulators such as the Lapsim® training system from Surgical Science (https://surgicalscience.com/systems/lapsim/), the LapVR simulator from CAE healthcare (https://caehealthcare.com/surgical-simulation/lapvr), the Lap Mentor™ (http://simbionix.com/simulators/lap-mentor/platforms/) from Simbionix, the ENSIM.LPR endosurgery simulator from Eidos Medicine (http://eidos-medicine.com/en/pdfs/EIDOS_Product_Catalogue.pdf) and others focus on teaching the coordinated 3D handheld manipulation of a couple of tools simulating the operating rooms instruments, by using force-feedback technology in combination with virtual reality graphics display. Examples of force-feedback technologies employed in those systems include the Xitact™ IHP and the Immersion AccuTouch System®.

Consistent with the findings of Correa et al. from the academic works, one major drawback of those prior art commercial simulators is that the corresponding devices are usually bulky and dedicated to one specific procedure. Due to the hardware constraints of integrating state-of-the-art haptic interfaces in the surgical simulators, they are built as an integral part of dedicated carts (usually hidden into a plastic box packaging) and do not mimic the actual patient anatomy, which is only comprehensive to the trainee thanks to the graphics display of a VR reality training scenario. In particular, the trainee does not experiment the practice of different trocar placements corresponding to different laparoscopy procedures.

In patent applications US2017/287361 and US2017/287362 by CAE Healthcare, it is proposed to integrate resistive haptic mechanisms and sensors in a duct defining an insertion path, the duct being used to guide a simulated medical instrument. Haptic mechanisms are positioned at haptic points along the duct. Each haptic mechanism comprises an actuator such as a motor, a piston, a spring arrangement or more generally a device capable of exerting a pressure to the haptic point, thus providing active feedback at the haptic point. Supplementary passive haptic solutions may also be employed at the haptic point, such as a brush, a bladder, a fabric, a material, a paint, to provide additional haptic feedback to the user such as passive resistance or friction. A plurality of haptic points may be defined and mechanically set up (for instance, using a displacement mechanism such as a rail) either manually or by use of motors controlled by a processor, which enables to simulate different anatomies and medical simulation use cases. At each haptic point, a sensor is co-located with each haptic mechanism to facilitate its independent control. Sensors may be cameras to capture images of the simulated medical instrument as it passes near the haptic point. While enabling a more versatile simulator deployment suitable for different anatomies and medical conditions, the necessary integration of multiple co-located haptic mechanisms and sensors along the insertion duct still makes it expensive to manufacture and maintain, and it is difficult to adapt this design to simulators which integrate real instruments handles, such as those from VirtaMed.

Another active haptic feedback simulator design was recently proposed by Eidos in patent application US2017/004732. An elongated instrument may be adapted with magnets inside and inserted in a linear electromagnetic motor device, to regulate the longitudinal movement of the elongated instrument as a motor translator (linear motor equivalent to a conventional motor rotor, yet generating a translation rather than a rotation movement). The elongated instrument may be adapted with motion sensors to track its movement and regulate the force feedback mechanism accordingly (including for instance simulation of pushing-back, braking, stopping, rubbing). The proposed regulated braking mechanism design still requires an additional separate electromagnetic motor for rotational movement regulation in addition to the linear electromagnetic motor (LEM) for longitudinal movement. These haptic mechanisms have to be integrated into the simulator base rather than on the instruments (in particular, the motors have to be screwed on the simulator base). Thus, it is not versatile enough to be easily adapted by the end user for different anatomies and medical conditions scenario simulations, for example when a change in portal positions during the procedure is required.

There is therefore a need for a more compact and adaptive medical simulator system with moveable and detachable components to facilitate realistic haptic feedback when manipulating instrument replicates in contact with the anatomy model, the instrument replicates being as close as possible to the real practice instruments. Preferably, such a simulator shall support a diversity of surgical procedure simulations possibly from different portals without requiring an expensive material design and/or maintenance, and without requiring a cumbersome setup and calibration procedure when switching between different procedures and portals.

BRIEF SUMMARY

The object of the present disclosure is a method to simulate a medical procedure scenario for at least one operator interacting with a medical simulator anatomy model, said anatomy model being mounted on rotational element allowing to change the orientation of the anatomy model, the method comprising:

detecting the orientation of the anatomy model,
  detecting the position of a virtual object into the medical procedure scenario, said virtual object being characterized by at least one material and/or physical property parameter and a virtual deformation model;
  updating the position, deformation model and material/physical property of the at least one virtual object according to the orientation of the anatomy model;
  acquiring a position and orientation from at least one instrument replicate manipulated by the operator, the instrument replicate being adapted to slide into an instrument hosting duct mounted on a portal entry of the anatomy model, said instrument hosting duct and said instrument replicate forming a linear electromagnetic motor;
  detecting a virtual contact between the acquired position of the instrument replicate and the updated virtual object position in the medical procedure scenario, the virtual contact causing a virtual deformation of the virtual object in the medical procedure scenario according to the updated virtual deformation model of the virtual object;
  calculating an axial force feedback signal to haptically render the interaction between the virtual object and the instrument replicate, the magnitude of the axial force feedback signal being a function of the virtual object position, the updated virtual object deformation model, the updated virtual object material and/or physical property parameters, as well as of the position and orientation of the instrument replicate;
  transmitting the calculated variable axial force feedback signal to a controller of the linear electromagnetic motor so as to produce an axial force along the instrument hosting duct axis.

Another object of the present disclosure is a medical simulation system comprising:

an anatomy model with at least one portal entry, said anatomy model being mounted on rotational element allowing to change the orientation of the anatomy model,
  an instrument hosting duct mounted on the portal entry,
  an instrument replicate adapted to slide into the instrument hosting duct,
  at least one instrument position tracking system to track the instrument replicate position and orientation,
  a mixed reality processor engine;
  a haptic controller;
  characterized in that, said instrument hosting duct and said instrument replicate are arranged to form together a linear electromagnetic motor; the mixed reality engine is configured to:
    a. acquire, with the instrument position tracking system, the position and orientation of the instrument replicate;
    b. acquire with an anatomy model's sensor the orientation of the anatomy model;
    c. update by the mixed reality engine, the position, deformation model and material/physical property of the at least one virtual object according to the orientation of the anatomy model;
    d. detect a virtual contact between the acquired position and orientation of the instrument replicate and the updated virtual object position and orientation in a medical procedure scenario, the virtual contact causing a virtual deformation of the virtual object in the medical procedure scenario according to the virtual deformation model of the virtual object;
    e. calculate an axial force feedback signal to haptically render the interaction between the virtual object and the instrument replicate, the magnitude of the axial force feedback signal being a function of the updated virtual object position, deformation model, material and/or physical property parameter, as well as of the position and orientation of the instrument replicate;
    f. transmit to the haptic controller the calculated variable axial force feedback signal, said haptic controller controlling the linear electromagnetic motor so as to produce an axial force along the instrument hosting duct axis.

BRIEF DESCRIPTION OF THE DRAWINGS

FIG. 8 compares the virtual scene and the physical setup at different times of interaction of a handheld instrument and a virtual deformable object.

DETAILED DESCRIPTION

Exemplary Laparoscopy Simulator

Figure 1:
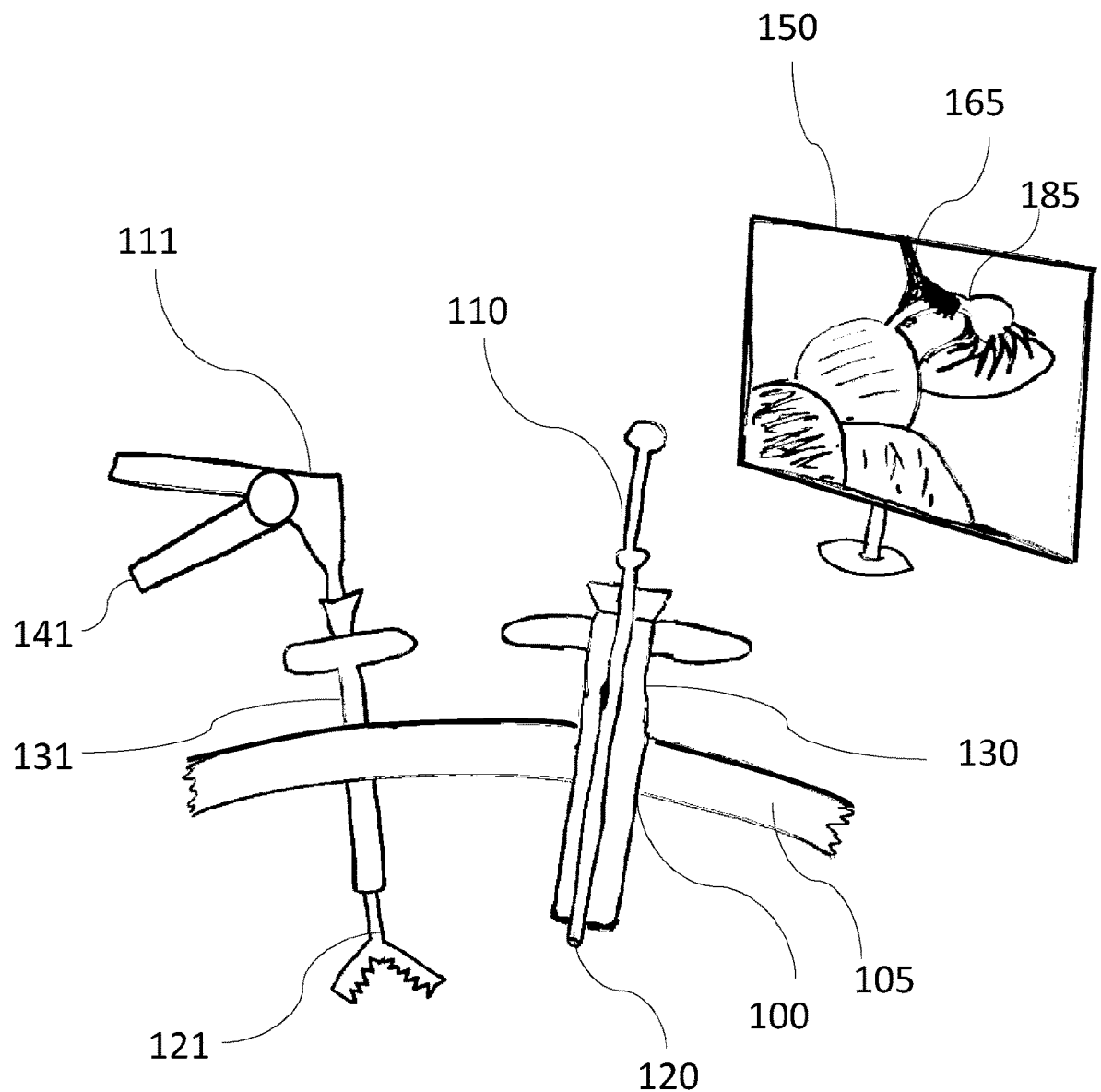
FIG. 1 shows a partial cut abstract view of a laparoscopy simulator according to a possible embodiment of the present disclosure, comprising an anatomy model, first and second trocars each adapted to receive a handheld instrument which is inserted on an anatomy model portal through the trocar and manipulated by the user according to a virtual reality scenario which is displayed in real-time to a screen.

Some possible embodiments of the proposed medical simulator system and methods will now be described in more detail with reference to an exemplary laparoscopy simulator system, as illustrated on FIG. 1. FIG. 1 shows a partial cut view of a simulator comprising a mannequin anatomy model 105, a first trocar 130 through which an imaging instrument 110 may be guided under the anatomy model skin 105 through a first portal 100, a second trocar 131 through which a laparoscopy instrument such as the grasper 111 may be inserted under the skin through a second portal (hidden behind on this side cut). The medical simulator also comprises a display 150 for rendering a virtual reality simulation of the surgery procedure. The VR scene may thus show the interaction of a virtual replica 165 of the instrument 111 as it manipulates a virtual replica 185 of an anatomy organ 185, as would be captured by the imaging instrument 110 in a real operation.

In order to provide realistic feedback to the user, his/her manipulation of the instruments 110, 111 may be tracked in real-time by an instrument position tracking system. According to one embodiment, the instrument position tracking system is based on sensors directly mounted on the instrument. According to another embodiment, the sensors are mounted on the anatomy model and passive elements such as magnets or coils are mounted on the instrument and cooperate with the active sensors. In a possible embodiment, as described for instance in U.S. Pat. No. 8,992,230, position and orientation sensors may be adapted on each instrument to track its position and orientation (6DOF) with a calibration unit to facilitate automated calibration relative to the anatomy model, and the sensors may be connected to a tracking unit which receives the sensor data as input and transmits it to a VR/AR data processing unit (MRPE). Other embodiments are also possible, for instance with motion sensors, inertial sensors (IMU). The instrument position tracking system can be using optical sensors such as cameras. In this case, two cameras are used to track the position as well as the orientation of the instrument. Thanks to image processing the images acquired by the cameras can be used to detect the position and orientation not only of one instrument but several instruments. The mixed reality processing engine may thus compute the actual virtual reality simulation scene according to the virtual scenario to be simulated (e.g. different organ pathologies as may be met in real practice) and to the actual manipulation of the instruments 110, 111, relative to the anatomy model 105, as measured by the instrument position tracking system.

The proposed simulator system preferably comprises standard surgery tool handles to facilitate as realistic as possible training of the surgeons. For instance, a grasper instrument 111 and a laparoscope 110 may be inserted into the body through the trocars at different portals. The user (or multiple users, in training a surgeon team as in real practice) interacts with the simulator system mannequin 105 by manipulating the instruments 110 and 111 according to the display on the screen 150 as captured and rendered from the imaging instrument (visual feedback) and according the touch feeling from the manipulating hands (haptic force feedback). In surgical simulation, virtual reality images of the scene comprising virtual organs 185 and virtual tools 165 may be displayed on the screen 150 in real-time while the simulator may be adapted with a haptic mechanism to provide realistic feedback to the user according the virtual reality scenario, without requiring the use of disposable organ models in the mannequin to replicate their actual surgery (such as cutting, removal or organ tissue, etc.). A passive feedback VR/AR simulation system in combination with space warping rendering methods as described for instance in U.S. Pat. No. 8,992,230 may further facilitate the realistic passive haptic experience of simple events such as the collision of a tool with a rigid surface by redirecting the virtual tool manipulation to touch surfaces of objects which are actually present in the physical model. However, for certain VR/AR simulation scenarios as may be met for instance in laparoscopy training, passive haptics cannot simulate the full range of user perceived manipulation, in particular in complex interactions with soft and elastic objects, such as cutting, grasping or pulling certain digestive tract organ surfaces.

In a preferred embodiment, the proposed simulator therefore also operates as an active haptic system. To this end, the trocars 130, 131 and the instruments 110, 111 may be connected to a haptic control engine (not represented) which commands actuators according to active haptic forces signals received from the mixed reality processing engine in charge with generating haptic signal commands as a function of the tracked instruments positions and orientations as well as the virtual scenario to be simulated (e.g. different organ textures resulting in different haptic touch as may be met in real practice). The haptic control engine may then compute, with a processor, the control signals to command the actuators associated which each pair of instrument and trocar, so that the user perceives, with his hands, the right haptic feedback in real time.

Figure 2A:
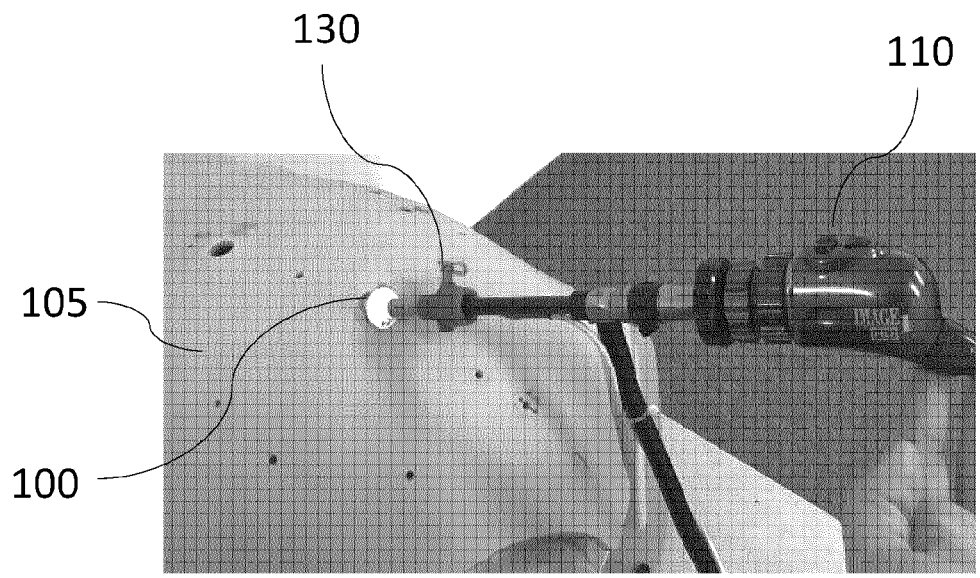
FIG. 2 and FIG. 3 provide different views of an exemplary anatomy model and the corresponding portals as well as possible trocar and instrument replicate positions on the model.
Figure 2B:
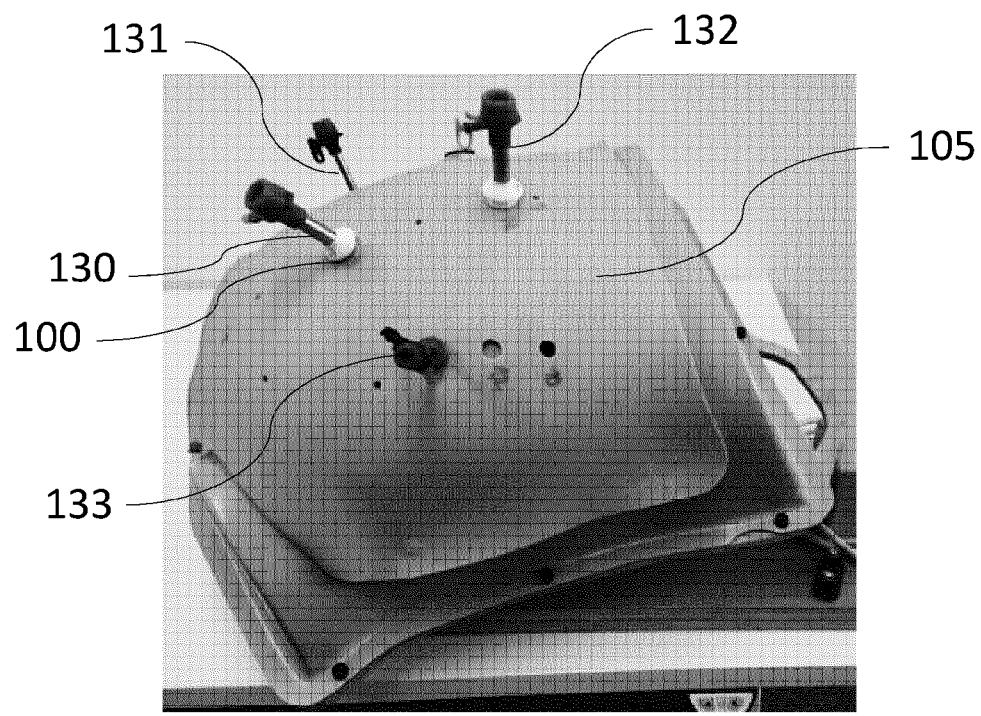
Figure 3A:
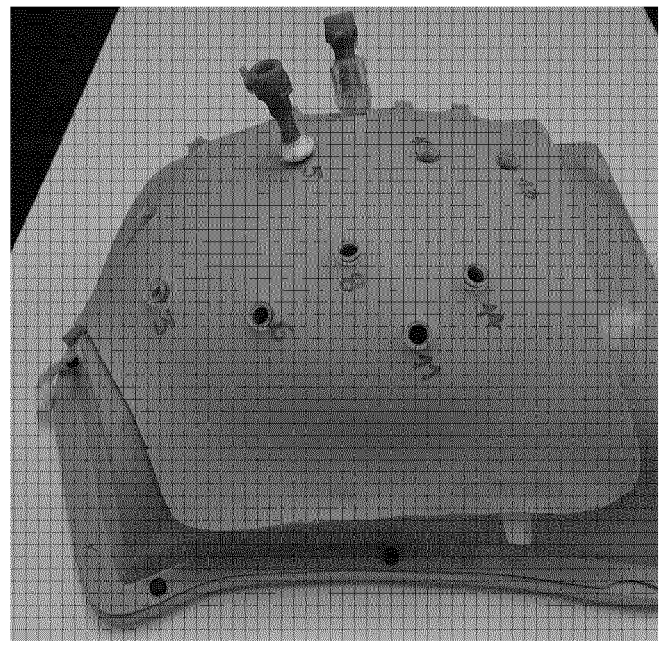
Figure 3B:
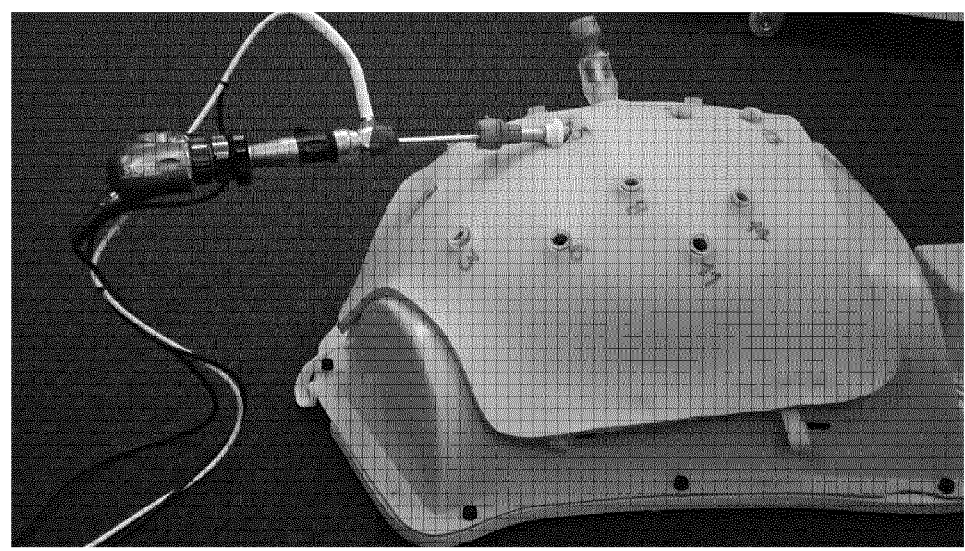

The anatomy model 105 may be an abdomen model particularly suitable for laparoscopy simulation such as the Chamberlain Group abdominal surgery trainer (https://www.thecgroup.com/product/ast-advanced-laparoscopic-hernia-skin-2140/), the Chamberlain Group insufflated abdomen (https://www.thecgroup.com/product/insufflated-abdomen-4061/) or its replaceable skin as represented in FIG. 2a), FIG. 2b), FIG. 3a), FIG. 3b), but other models may also be used, for instance the abdominal examination trainer model by Limbs & Things (https://www.limbsandthings.com/global/our-products/details/abdominal-examination-trainer), or other mannequins. The part of the anatomy model 105 which imitates the human body skin may be made of plastic, silicon, rubber, polyurethane, or any other suitable material.

Figure 12:
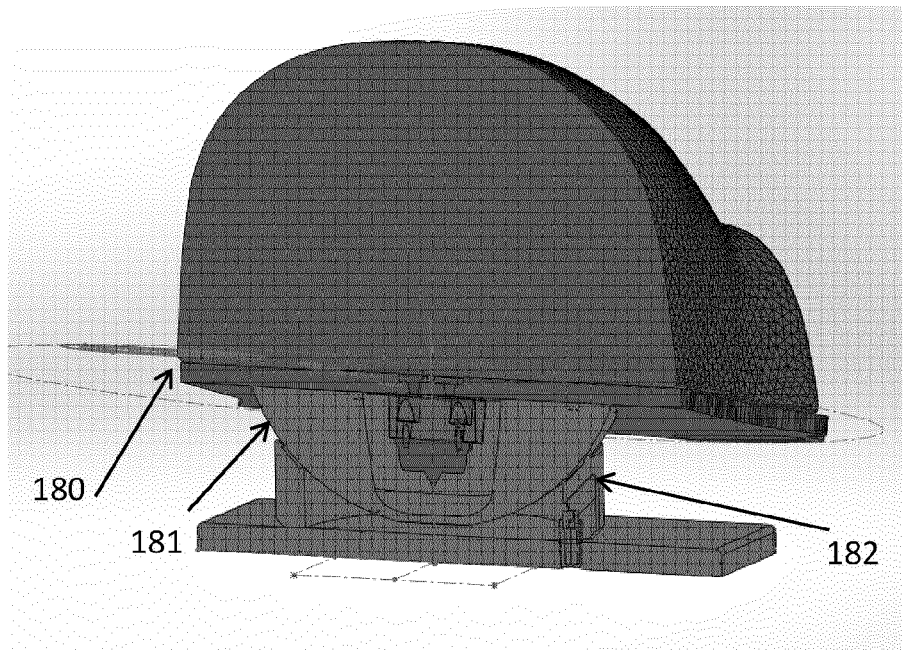
FIG. 12 illustrates an embodiment in which the model anatomy is mounted on a rotational element.
Figure 13:
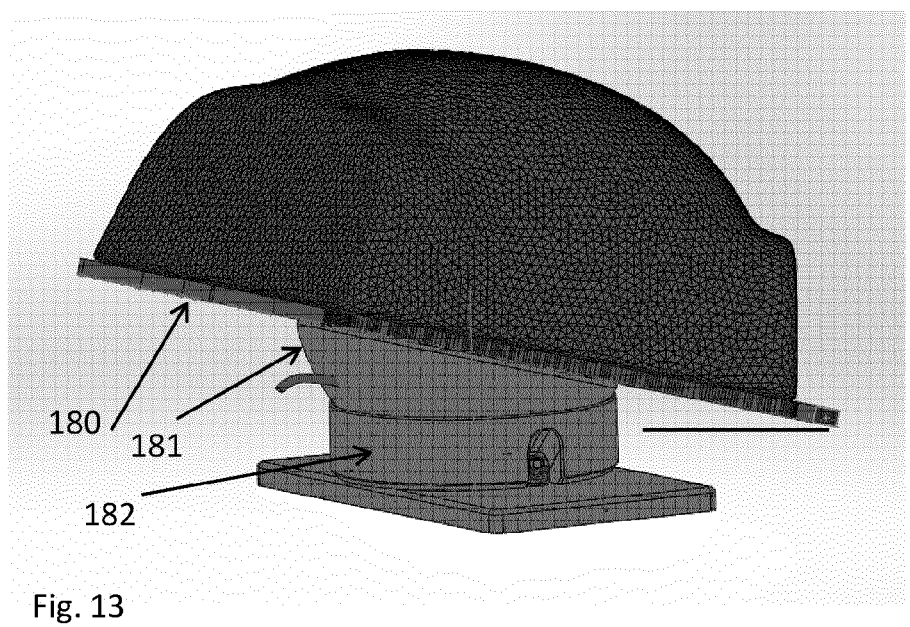
FIG. 13 is a section view of the example of the FIG. 12.

According to a particular embodiment the anatomy model 105 is mounted on a rotational element allowing to move the anatomy model 105 into different positions. For that purpose, the anatomy model 105 is first mounted on a plate. The plate is the interface between the soft material of the anatomy model and the rotational element. The rotational element is made of two parts allowing a certain degree of movement around a central point. In the examples of the FIGS. 12 and 13, the first part of the rotational element is made of a round shaped element 180 fixed with the plate. The second part of the rotational element is a receiving element 181 for the round shaped element. In another example, not represented, the first and second part can be interchanged.

In a particular realization, the friction between the first and the second part is maintained by the presence of friction elements arranged at the contact location 182 of the first and second part. The friction elements are, for example, rubber or silicon pads or rings.

The rotation of the anatomy model 105 allows to better simulate realistic conditions. Depending on the situation simulated, the position of the model during the training plays an important role. Therefore the anatomy model is freely adjustable around a central rotational point.

Beside the simulation of more realistic conditions, the fact that the anatomy model is oriented in different positions has a consequence on the positions and behaviors of the virtual organs.

The medical simulator comprises means to detect the orientation of the anatomy model compared to a default orientation. For that purpose, according to one embodiment, a sensor is mounted in the rotational element and detects the orientation of the anatomy model. In another embodiment, at least two cameras having a viewing angle toward the anatomy model, are used to determine the orientation of the anatomy model. This could be same cameras as the one used in the instrument position tracking system.

The gravity plays a role in the position and behavior of the organs and the situation is simulated by computing an updated position and behavior of the organs in view of the actual orientation of the anatomy model. This updated position and behavior is used for two purposes, the first one is the realistic rendering on a screen of the medical simulator and the second one is for defining the feedback force applied on the medical instrument. Since the position and/or orientation of the organ changes due to the gravity, the feeling changes while the medical instrument comes into contact with this organ. The feeling is then converted into a different feedback force.

Different portals may be cut on the model to enable the simulation of different medical practices of laparoscopy portal placements, for instance respectively corresponding to different pathologies or different schools. FIG. 2a) illustrates the insertion of an imaging instrument 110 through a trocar 130 at a portal 100 on a Chamberlain abdomen model 105. FIG. 2b) shows a different photo of the same anatomy model 105 where a diversity of possible laparoscopy portals (visible as holes on the model 105) have been prepared, and four trocars 130, 131, 132, 133 have been fixed on a subset of four of the possible portals on the abdomen model 105.

As will be apparent to those skilled in the art of mechanics, the trocars 130, 131, 132, 133 may be fixed to the anatomy model 105 by various mechanical means such as screws, glue, magnets, snap mechanisms, flexible interlocks and others. In a preferred embodiment to facilitate quick plug-and-simulate swapping of the surgical procedure simulation scenarios while minimizing the overall cost of the simulator equipment, non-permanent fixing of each trocar 130, 131, 132, 133 onto the anatomy model 105 may be preferred, so that the simulator hardware only requires a limited number of trocars (e.g. 4 or 5 trocars as may be required in the surgical procedures) which can be interchanged from one portal to another one. FIG. 3a) shows an exemplary anatomy model adapted with different portal holes, each portal being adapted to host any trocar in a fully interchangeable manner.

Figure 4A:
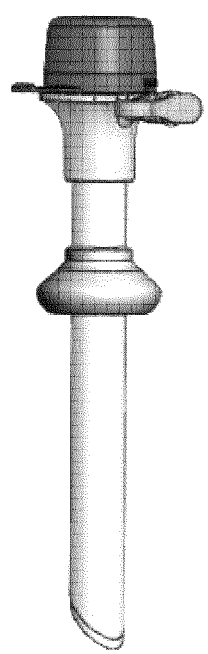
FIG. 4 shows an exemplary mechanical arrangement of the trocar-like duct so that it can be easily fixed on and off the anatomy model portals while remaining attached in a rigid enough way on the anatomy model to provide a hold point for force feedback actuation.
Figure 4B:
Figure 4B:
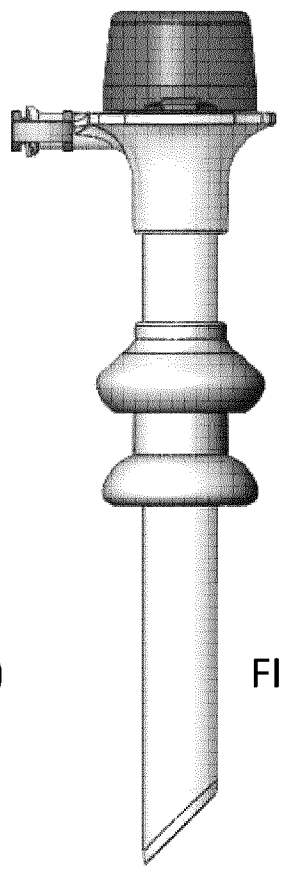
Figure 4C:
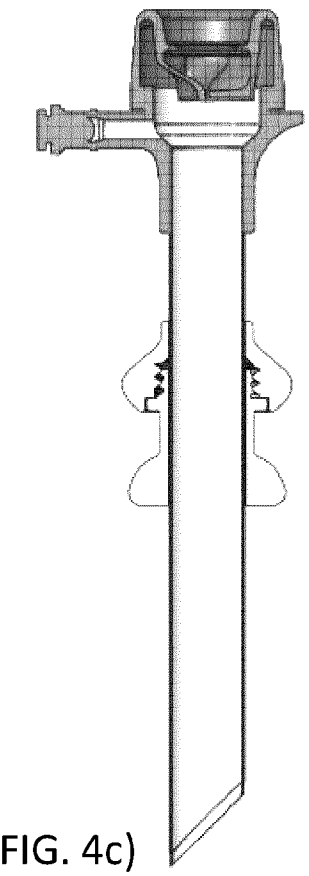
Figure 4D:
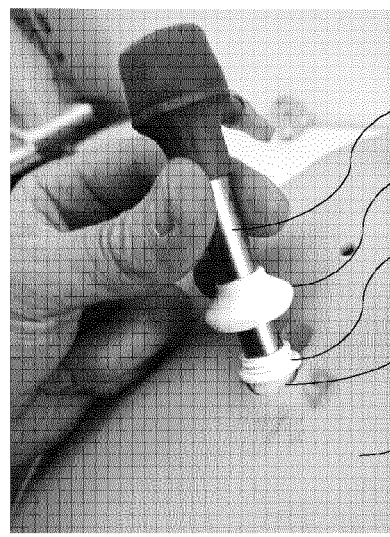

FIG. 3b) illustrates a further embodiment wherein the trocar-like instrument hosting duct attachment mechanism to the anatomy model is flexible enough so that the insertion of the instrument may change the orientation of the trocar, thus facilitating the teaching of proper, careful instrument insertion in various medical simulation scenarios. As will be apparent to those skilled in the art of mechanics, various attachment mechanisms may be suitable to this end. In a possible embodiment, the suspension of trocar-like duct 130 to the anatomy model 105 may consist of a nut 400 (on the trocar-like duct) and a thread part 410 (on the anatomy model portal hole), which can be screwed together to ensure a good trocar-like duct suspension, but other attachment mechanisms embodiments are also possible. As a possible nut and thread mechanical embodiment of the attachment mechanism, FIG. 4a), b) and c) show respective split, attached and sectional views of the proposed trocar-like duct nut 400 and thread 410 arrangement. FIG. 4d) further shows an exemplary placement of such a trocar-like duct with white thread 410 and nut 400 parts at a portal entry 100 onto the anatomy model 105. As will be apparent to those skilled in the art of mechanics, other arrangements are also possible, for instance using a snap mechanism.

Examples of different medical practices which may be simulated by the proposed system include, but are not limited to: laparoscopic examination of the appendix, the gall bladder, the liver, the pancreas, the small intestine, the large intestine (colon), the spleen, the stomach, pelvic or reproductive organs; laparoscopic cholecystectomy (removal of the gall bladder), appendectomy (removal of the appendix), hysterectomy (removal of the uterus), salpingo-oophorectomy (removal of the ovaries and fallopian tubes), tubal ligation and its reversal (for surgical contraception), removal of ovarian cysts, removal of fibroids, blocking blood flow to fibroids, endometrial tissue ablation, adhesion removal, Burch procedure for incontinence, vault suspension for prolapse; proctosigmoidectomy, right colectomy or ileocolectomy, total abdominal colectomy, fecal diversion (temporary or permanent ileostomy or colostomy), abdominoperineal resection, surgical removal of the anus, rectum and sigmoid colon, rectopexy, total proctocolectomy; gastric banding, gastric by-pass, sleeve gastrectomy; removal of tumors, masses and cysts; hernia repair, and fundoplication for acid reflux disease; nephrectomy, ureterolithotomy, pyelolithotomy.

A wide variety of laparoscopic practices from different medical training schools worldwide may be separately simulated thanks to the inherent interchangeability of the portals in the proposed system, such as the French practice, where one operator stands between the legs of the patient, or the American practice, where operators stay on the left and right sides of the patient. As will be apparent to those skilled in the art of laparoscopy, the trocar diameters vary from product to product, generally in the range of 3-6 mm for the small trocars and up to 10-14 mm for the large ones. Four trocars are usually used in the French procedure for laparoscopic cholecystectomy. The first 10-mm trocar is inserted in a portal in the upper part of the umbilicus in an oblique direction (45°) to hold the laparoscope. The two 5-mm trocars are placed on two further portals positioned 1 cm under the right coastal margin and spaced apart as widely as possible; one is used for retraction, aspiration and irrigation, while the other is used for grasping instruments. The last 10-mm trocar is positioned in a fourth portal on the left hypochondrium to hold standard instruments such as hooks, scissors, as well as clip appliers. Other procedures may require the use of a 12-mm trocar to insert larger instruments such as staplers and pouches. A comparison of French and American schools for laparoscopic cholecystectomy practice can be found for instance in *Ergonomic assessment of the French and American position for laparoscopic cholecystectomy in the MIS Suite*, K. H. Kramp et al., Surg Endosc (2014) 28:1571 1578—DOI 10.1007/s00464-013-3353-1.

For the sake of realistic simulation, replicating only the top of a real trocar may be sufficient, while the interior of the trocar tube which is not visible in the manipulation may be specifically arranged for simulation as will now be described in further detail.

While the exemplary simulator system has been described in the context of laparoscopy wherein an instrument is inserted into a trocar, the proposed simulator system and method may be more generally applicable to any medical procedure wherein an instrument is inserted through a body entry. Throughout this disclosure, the terminology portal is thus used to refer to a hole through which an instrument is inserted into the physical anatomy model. In laparoscopy, this entry is facilitated by the use of a trocar, but other simulators, for instance endoscopy simulators for hysteroscopy or bronchoscopy, may not need a trocar as the endoscope is entered through a natural orifice.

Handheld Linear Electromagnetic Motor Arrangement

An embodiment of the proposed simulator handheld instruments which is particularly advantageous in terms of compactness, cost of manufacturing and maintenance, flexibility in interchanging portal placements and instruments insertion while providing realistic feedback to the user manipulating the instruments along the simulation procedure will now be further described.

Figure 5:
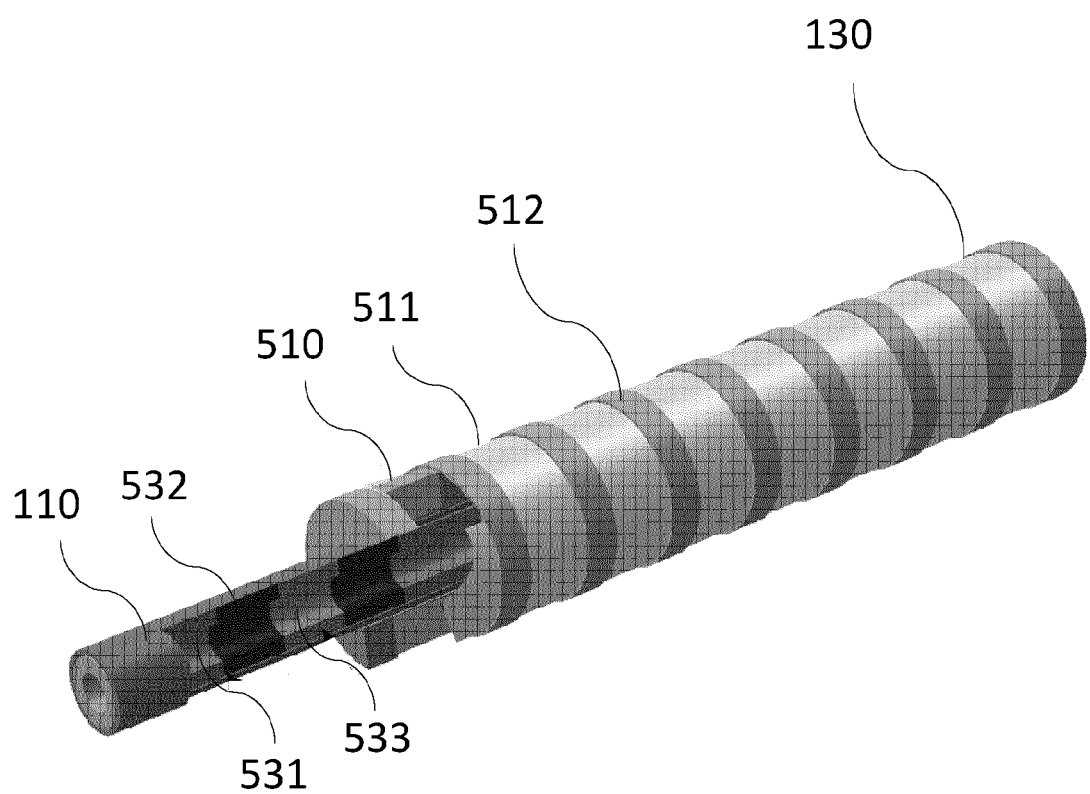
FIG. 5 shows a partial sectional view of a trocar-like instrument hosting hollow tube and an elongated instrument rod adapted to form together a compact linear motor, in order to provide a haptic force feedback to the user along the axis of the duct.

In a possible embodiment, as illustrated by FIG. 5), haptic feedback may be provided to the end user by adapting the duct and the instrument replicate to form a linear electromechanical actuator (LEMA), so as to produce a force feedback to the user manipulating the instrument through the portal.

In a possible embodiment of the exemplary laparoscopy simulator of FIG. 1), each trocar-like instrument hosting duct 130, 131, 132, 133, 134 may be adapted to form the stator of a tubular linear electro-magnetic motor (LEM) while each instrument 110, 111 may be adapted to act as its translator (rotor). FIG. 5) provides a partial split view of such a possible arrangement:

A trocar-like hollow tube may be arranged to host a series of coils 510, 511 corresponding to different motor phases, mounted in alternance clockwise/counterclockwise and interspaced by spacers 512 to separate the coils.

The instrument interior rod 110 may be arranged to host an alternance of magnets: first magnet 531, second magnet 533 arranged relative to the first magnet 531 so that they push back each other, etc. In a possible further embodiment, a spacer 532 may be inserted between the magnets. In a possible further embodiment, the spacer may be ferritic to improve the magnetic field as may be generated by the LEM arrangement, but other embodiments are also possible.

Depending on the simulator system design constraints and applications, other embodiments are also possible. In an alternate embodiment, the instrument replicate may be adapted to form the stator of the LEM, while the trocar-like duct may be adapted to form its translator (rotor). In another embodiment, an additional arrangement of coils and permanent magnets is added to produce a torque around the instrument axis. In another embodiment, the haptic controller can be programmed to detect (by reading the position and orientation sensors) the direction in which the instrument is being moved and creating a force in opposite direction of the movement, faking thus tearing- and/or friction-forces, for instance those which are typically experienced when piercing a hole into tissue and pushing or pulling the instrument through a narrow hole. In yet another embodiment, the mixed reality processing engine can delegate the computation of the linear force magnitude to the haptic controller, for an increased control stability. More generally, in simulators for endoscopy procedures not requiring a trocar, a duct may be mechanically arranged behind each portal entry on the anatomy model to host and guide the instrument replicate while still forming a two-parts electromagnetic linear motor with the latter, similar to the arrangement of a laparoscopy trocar replicate duct. Throughout this disclosure, the terminology instrument hosting duct is thus used to refer to a duct through which an instrument is manipulated into the physical anatomy model. The duct may be attached to any portal on the anatomy model, depending on the simulator applications. The duct may be made of plastic or any suitable material to constitute either the rotor or the stator of the LEM. The ducts and portals may either be fixed arrangements, or interchangeable using mechanical arrangements as previously illustrated with the trocar portal attachment examples of FIGS. 2a), 2b), 3a) and 3b), so as to facilitate the versatility of the simulator system training practices.

Handheld Linear Electromagnetic Motor Control

The proposed two-parts LEM arrangement generates a linear force (axial force) along the axis of the trocar-like duct according to the law of Lorentz and dependent on the electrical current applied to the coils, the number of coil windings, the direction and the strength of the magnetic field.

Figure 6:
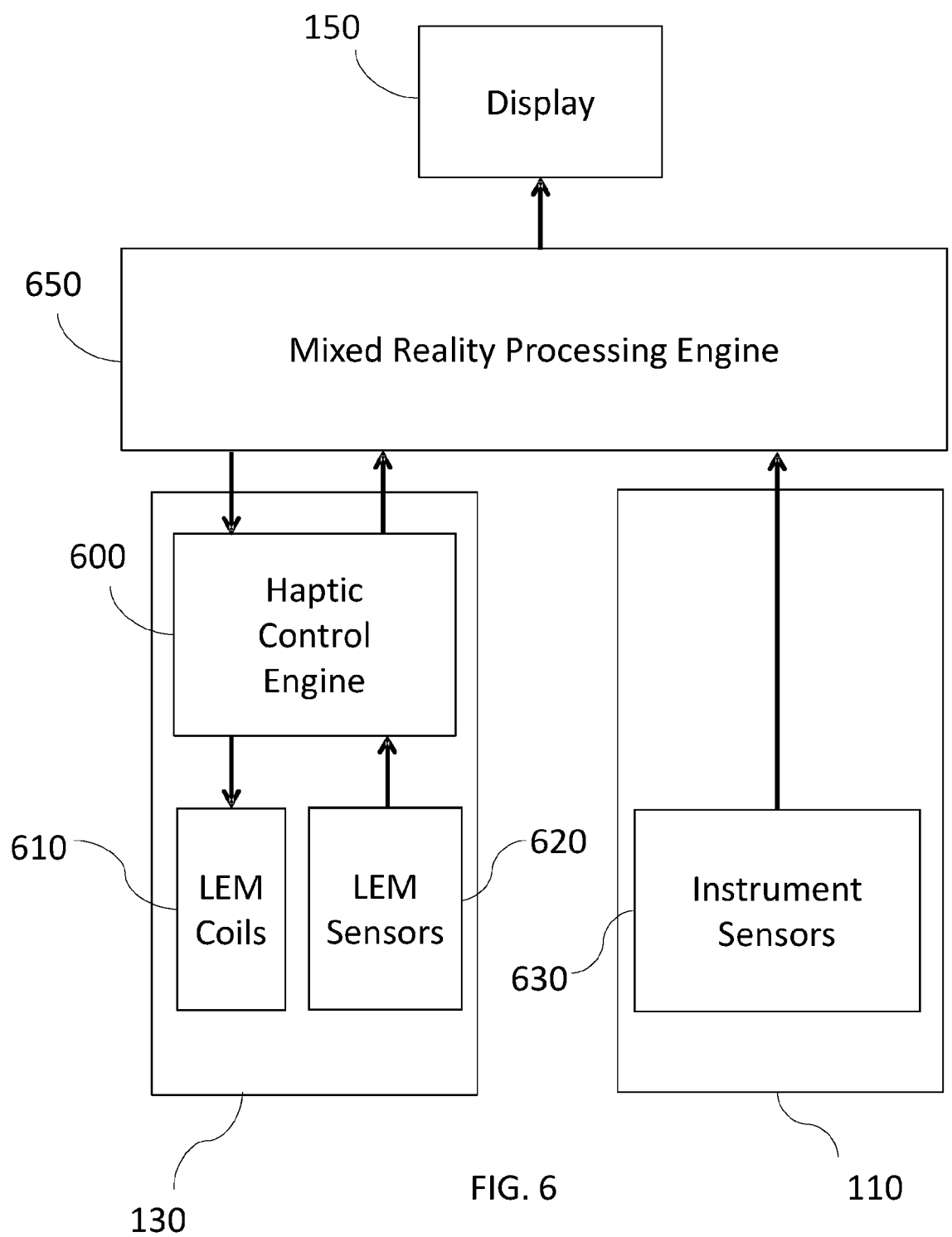
FIG. 6 depicts a possible combination of system components for the proposed simulator.

In a preferred embodiment, as represented on FIG. 6), a haptic control engine 600 may control the linear motor 610 by powering the LEM coils 610 so that the LEM arrangement acts as an electromagnetic axial force feedback mechanism when the elongated instrument rod 110 is inserted into the trocar-like instrument hosting duct 130.

The haptic control engine 600 comprises an electronic circuit including a microcontroller (haptic controller) which receives control commands from the mixed reality processing engine 650 and an amplifier to power the LEM coils 610 accordingly. In a possible embodiment, two phases may be used, so that only two pairs of wires need to be conducted from the haptic control engine to the trocar hollow tube interior to power it (one pair of wires for clockwise coils corresponding to phase 1, one pair of wires for counterclockwise coils corresponding to phase 2). These arrangements facilitate in particular a compact and invisible integration of the electromagnetic motor stator into a trocar-like instrument hosting duct 130.

For the sake of compactness, preferably the haptic control engine 600 may be realized as a small printed circuit board (PCB) element which may be easily integrated on the trocar-like duct 130 for powering and commanding the coils. The PCB contains all the power electronics, drive- and safety-logic and communication means used to drive a two-phase linear motor. Therefore, the signal lines and one power line may be wired as a single cable to the trocar-like duct 130 arrangement. In this case the power line is only providing DC power.

The instrument hosting duct 130 may also further comprise one or more LEM sensors 620 for the haptic control engine 600 and/or the mixed reality processing engine to monitor and control the operation of the LEM arrangement. In a possible embodiment, one or more sensors 620 such as magnetic sensors (for instance, Hall sensors), optical sensors, motion sensors or others may be integrated within the instrument hosting duct 130 hollow tube to detect the insertion of the instrument replicate 110 as the complementary LEM part, so as to detect when to start powering the LEM coils. In a further possible embodiment, a temperature sensor 620 may be further integrated along the PCB side and the temperature information may be used by the haptic control engine 600 to adapt the powering of the coils when necessary to prevent the motor from overheating.

In a possible embodiment, the haptic control engine 600 may read sensor information from the instrument hosting duct sensor arrangements 620 and may update the control commands to power the LEM coils according to the sensor information (e.g. switch-off). In a further possible embodiment, the haptic control engine 600 may transmit the data from the LEM sensor 620 to the mixed reality processing engine 650, so that the mixed reality processing engine uses it to calculate, with a mathematical model of the virtual scenario to be simulated, the haptic control commands to actuate on the LEM (for haptic feedback) and/or the virtual reality information to render to the end user on the display 150 (for visual feedback).

In a possible embodiment, the haptic control engine 600 may then be connected to a nearby or remote personal computer hosting the main powering unit and the mixed reality processing engine 650 through a cable attached on the head part of the trocar above the portal entry, just as with conventional trocars suitable for inflating, so that it does not disturb the realism of the physical simulator. In a possible embodiment, as illustrated by FIG. 6, the PCB may be hidden into the standard inflation-capable trocar cap and the power and control lines from the haptic engine unit to the PCB may be carried to the trocar through its the T-shape connector just similar to the wiring of a standard instrument such as the imaging tool, so that it is not noticed as cumbersome by the trainee. Moreover, with such a compact arrangement, any instrument may be placed in any trocar and the trocars may be easily placed on different portals, which is a significant advantage over prior art simulators which require a fixed integration of the haptic mechanisms aside the simulated trocars and instruments, while the proposed embodiment no longer require any permanently fixed mechanism on the anatomy model. It is thus possible to build a kinesthetic feedback system which primarily uses the hidden linear motor coils 610 inside the hollow tube of the trocar-like instrument hosting duct 130, the hidden magnets inside the rod of the instrument replicate 110, the hidden position and orientation sensors 650 inside the instrument replicate 110, and the hidden haptic control engine 600 and LEM sensors 620 integrated in the cap of the trocar-like instrument hosting duct.

Simulator Control Engine and Methods

The proposed arrangement enables to provide kinesthetic feedback to the user manipulating the instrument by opposing a linear force in the axial direction of the trocar-like duct. In a preferred embodiment, the mixed reality processing engine 650 calculates the command signal to be applied by the haptic control engine 600 to power the LEM coils 610 as a function of at least the actual tracked position of the instrument replicate 110 along the trocar-like instrument hosting duct 130 and the training scenario to be rendered on the simulator display 150. It is to be noted that the mixed reality processing engine 650 receives the orientation of the anatomy model 105 and computes an updated medical environment. The position and the behavior of the organs are updated as a function of the orientation of the anatomy model. This will affect the visual feedback for the trainee and the force feedback applied on the medical instrument. Thus, the trainee perceives his/her interaction with the training environment according to a combination of:

a visual representation of the training scenario, as rendered on the display 150, and a tactile representation of the training scenario, as actively fed back to his/her hand(s) by the haptic system made of the instrument hosting duct(s) 130 and the instrument replicate(s) 110.

For the mixed reality processing engine 650 to calculate in real time the virtual reality scene to be rendered as well as the haptic commands to be actuated by the haptic control engine 600 according to the simulator operation by the trainee, the actual position and orientation of each instrument replicate 110, 111 may be tracked by at least one instrument sensor 630. The virtual reality is further computed as the function of the orientation of the anatomy model. Various sensor arrangements may be used, such as with magnetic, resistive, capacitive, inductive, optical, inertial, or acoustic sensors. The sensors may be adapted inside, over or external to the instrument replicate so that they do not disturb its handling by the trainee. In a possible embodiment, a 6DOF magnetic sensor 630 may be integrated at the tip of each instrument replicate 110, 111, similar to prior art VirtaMed simulator sensor arrangements as described for instance in U.S. Pat. No. 8,992,230.

In order to avoid that the sensor measurement is disturbed by the electromagnetic motor coils, in a possible embodiment, the mixed reality processing engine may detect when the instrument tip is inserted into the trocar-like duct and when it goes out of it; during that path, there is no need to provide kinesthetic feedback to the end user other than the passive friction of the instrument traversing the trocar tube, as there is no possible interaction with the organs in the VR/AR simulation as long as the instrument tip remains in the trocar-like instrument hosting duct, so the haptic control engine may switch off the power to the coils until the VR engine detects that the instrument tip is out from them by several centimeters. The haptic control engine may then switch on the power to the coils and start to control the haptic feedback replicating the linear force on the instrument as in the simulated surgery scenario operation. This is consistent with the real laparoscopy practice where the instrument first traverses $CO_2$ gas in the inflated abdomen.

To facilitate the detection of the instrument 110 insertion into an instrument hosting duct 130, the latter may be further equipped with a sensor 620, for instance a Hall sensor, an optical sensor, a motion sensor, or others. In a possible embodiment, two Hall sensors 620 may be arranged on the trocar-like instrument hosting duct 130 to measure in sub millimeter precision the actual position of the surgical instrument 110 when inserted into the duct 130. This position information may be used as a LEM sensor 620 to commutate the motor coils and to inform the MRPE 650 about the current position of the instrument 110 in respect to the position of the trocar-like instrument hosting duct 130. In a possible embodiment, the haptic control engine 600 may minimize the force ripple of the LEM by using pre-calibrated hall-Sensors to take into account the actual position offset (depending on the manufacturing constraints) between the EM sensor 620 and the LEM coils 610. This enables to increase the motor efficiency and minimize the force ripple between the switched coil transitions when the instrument 110 is moved into the duct 130.

The instrument hosting duct sensor information 620 may also be used by the mixed reality processing engine 650:

to improve the proposed simulator tracking system accuracy by calculating a sensor data fusion between the instrument tracking sensor 630 and the duct Hall sensors 620, similar to the over-calibration methods described for instance in U.S. Pat. No. 8,992,230, and/or to automatically detect the actual simulator setup in the training procedure initial steps, by identifying from their respective sensor information which instrument 110, 111 has been inserted in which trocar-like duct 130, 131, 132, 133. The mixed reality processing engine 650 may in particular automatically derive, from the instrument position and orientation sensors, the anatomy model portal to which the trocar-like duct has been attached.

As will be apparent to those skilled in the art, the combination of the proposed compact sensor arrangement with the mixed reality processing engine logics thus facilitates the setup, initialization and maintenance of the proposed simulator system which can automatically switch between versatile training procedures (e.g. different medical practices) for different trainees. This gives a significant functional and commercial advantage over prior art simulators that require either the bulky arrangement of additional sensors on the trocar-like instrument hosting ducts and/or the anatomy model dedicated to the setup detection, or the design of a dedicated, cumbersome setup registration procedure, for instance through a graphical user interface settings page for the user to manually configure the hardware setup for the WAR engine to start from.

Axial Force Feedback for Virtual Object Manipulation

Once an instrument 110 has been inserted beyond the inner end of a trocar-like instrument hosting duct 130, depending on the simulation scenario and the tracked position and orientation of the instrument 110, the mixed reality processing engine 650 may detect a possible interaction of the instrument 110 with virtual objects in the virtual reality scenario, for instance involuntary collisions and/or voluntary manipulations such as pushing, grasping and pulling, cutting, etc. In the simplest scenarios such as laparoscopic examinations, without active surgery, the user primarily learns how to handle the laparoscope and possibly a simple tool to push on the anatomy elements such as organ soft tissue or stiffer and firmer tissue around tumors, to get a better joint view and feel of their structures. As the laparoscope and tool instrument are linearly guided into the trocar, the user manipulation is primarily constrained in the corresponding direction, that is the linear axis of the LEM arrangement constituted by the trocar-like duct 130 and the handheld instrument replicate 110. The mixed reality processing engine 650 may calculate accordingly a command feedback signal for the LEM actuator 610 to produce a variable axial force in the direction of the trocar-like duct 130 axis as a function of the instrument replicate 110 position and orientation tracked with the instrument sensor 630 in the physical setup and of the simulated virtual object position, deformation, and material property in the virtual reality scene, as may be represented for instance by a computer graphics mesh, in accordance with the simulation scenario. The virtual object is defined as a 3D object in which the 3D-shape is defined in the reality processing engine. Various parameters characterize the virtual object such as the material or physical parameter, the texture or the deformation model (i.e. how the virtual object reacts to a pressure force).

Figure 7:
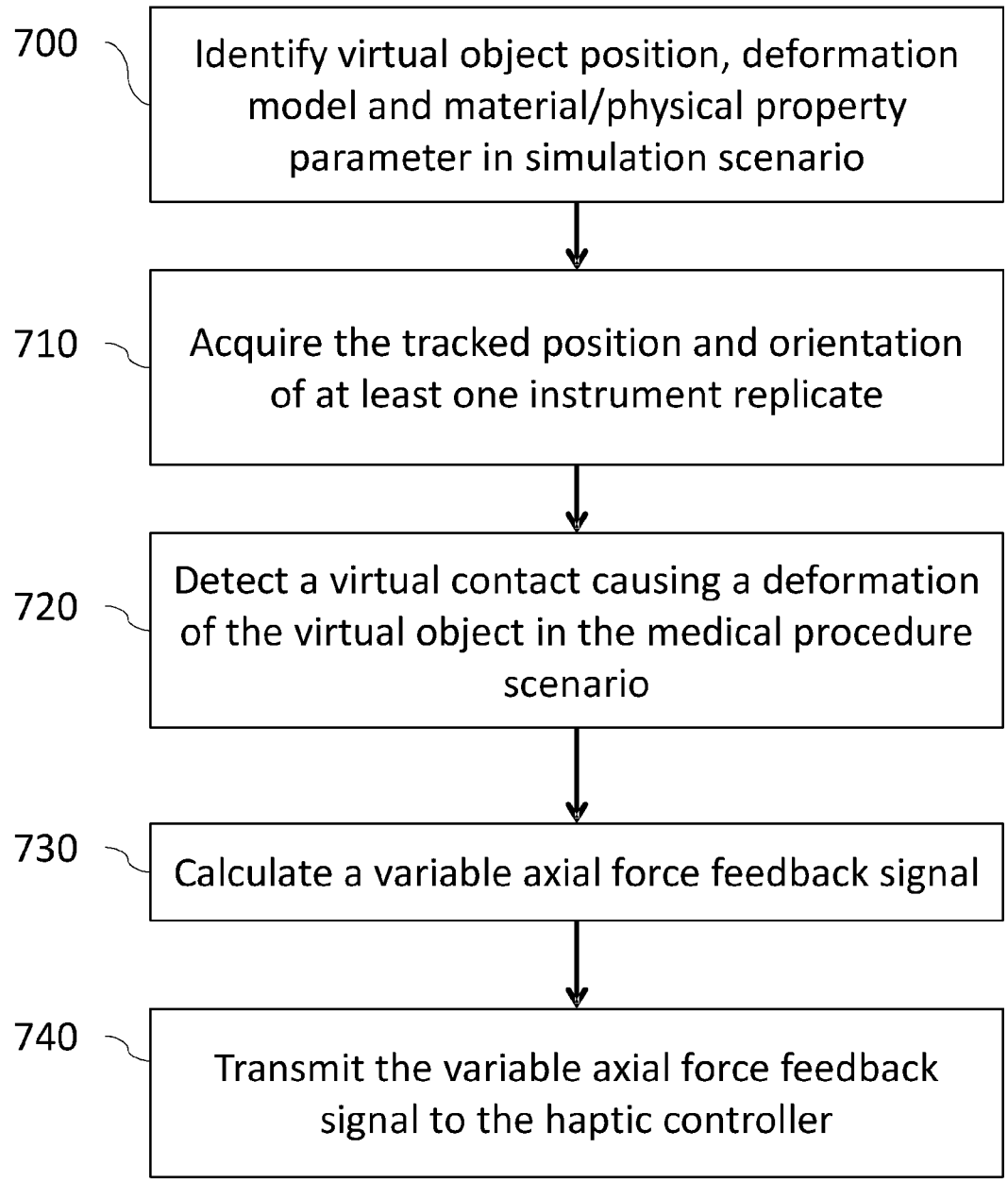
FIG. 7 shows an exemplary workflow for the proposed simulator mixed reality processing engine.

As represented by FIG. 7, to simulate a medical procedure scenario for at least one operator of the proposed medical simulator, the mixed reality processing engine 650 may thus be adapted to:

Detect 700 the orientation of the anatomy model 105,
Detect 710 the position, deformation model and material/physical property of at least one virtual object to simulate in the medical procedure scenario,
Update 720 the position, deformation model and material/physical property of at least one virtual object according to the orientation of the anatomy model;
Acquire 730 the tracked position and orientation of at least one instrument replicate 110 manipulated by the operator, the instrument replicate 110 being adapted to form a linear electromagnetic motor in association with an instrument hosting duct 130 when the instrument replicate 110 is inserted and slides into said duct 130;
Detect 740 a virtual contact between the tracked position and orientation of the instrument replicate 110 and the virtual object position in the medical procedure scenario, the virtual contact causing a deformation of the virtual object in the medical procedure scenario;
Calculate 750 a variable axial force feedback signal, the signal varying over time in magnitude and/or frequency as a function of the virtual object position, of the tracked position and orientation of the instrument replicate 110, and of the virtual object material/physical property;
Transmit 760 the calculated variable axial force feedback signal to a haptic controller of the linear electromagnetic motor to power, with the haptic controller, the linear electromagnetic motor formed by the instrument replicate 110 and the instrument hosting duct 130.

In computer graphics, the virtual object material and/or physical property may be a parameter of a mechanical model which governs the deformation of the material when a force is applied to it, or vice versa. The material properties and the mechanical modeling may lead to characteristic stress-strain curves of a virtual solid body/object. For instance, the mixed reality processing engine may use for some virtual objects a very simple linear elasticity material model, which states that the relative elongation of a material probe (strain) is proportional to the force applied per unit of its area (stress). In this case, the material property may be specified by two parameters, namely Young s modulus and Poisson s ratio. For a more realistic modeling of the physical behavior, implementations of non-linear effects, viscoelasticity, plasticity and viscosity may be considered, with additional material property parameters. They all describe how material deforms under the influence of forces.

More generally, a review of some possible models suitable for e.g. needle insertion modeling can be found in Correa et al. in *Haptic interaction for needle insertion training in medical applications: The state-of-the-art*, Medical Engineering and Physics 63 (2019) 6-25. Virtual objects may have a diversity of mechanical behaviors such as elasticity, viscosity, plasticity, which may be characterized by their physical and/or material properties such as mass, Young s modulus, Poisson ratio and/or Cauchy s tension as the parameters for different mechanical models. Depending on the simulation scenario, one or more of such models may be applied and/or combined by the mixed reality processing engine to calculate the haptic force feedback signal to be applied by the 1DOF LEM specifically projected onto the LEM linear axis, that is the axis of the instrument hosting duct 130.

A diversity of numerical methods may be used by the mixed reality processing engine 650 for force feedback signal discretization and calculation. In a possible embodiment, the mixed reality processing engine 650 may execute, with at least one processor, a real-time mathematical solver to approximate a realistic enough estimation of the force feedback values under the time-dependent, non-linear stress-strain constraints. In general, numerical solvers adapted from the FEM (Finite Element Methods) may be suitable to this end. As will be apparent to those skilled in the art, various solvers may be used to this end, for instance a FEM solver, a Position-Based-Dynamics (PBD), a Projective Dynamics solver, a Gauss-Seidel solver, a Jacobi solver, and others.

In a possible embodiment, the magnitude of the variable axial force feedback signal to regulate the linear electromagnetic motor formed by the instrument replicate 110 and the instrument hosting duct 130 may thus be calculated according to at least one virtual deformation model suitable to the virtual object to be simulated in the virtual scenario, as a function of at least one material and/or physical property of the simulated object and the relative position and/or orientation between the instrument and the virtual object. The latter relative position and/or orientation may be derived from the tracked position and orientation of the instrument replicate as measured from the sensors, and the virtual object position and orientation as calculated by the mixed reality processing engine. In a possible embodiment, the MRPE may determine the angle between the instrument replicate and the surface of contact on the virtual object, and calculate accordingly the magnitude of the axial force feedback to generate with the LEM.

This is further illustrated by the example of the FIG. 8, showing a virtual scenario in which a deformable object is manipulated by the trainee and its corresponding physical setup in which the deformable object has no physical replicate. In FIG. 8a), the mixed reality processing engine 650 detects a virtual contact between the tip of the instrument replicate 110 sliding in the trocar-like instrument hosting duct 130 and a first surface position 801 p(t1) of a virtual object 800. In accordance with the training simulation scenario, the virtual object 800, for instance the liver or bladder organ, may be identified by the mixed reality processing engine 650 at a certain position (and possibly orientation) (for instance, represented by a geometrical mesh in a computer graphics VR scene) and associated with at least one material property parameter and virtual deformation model (for instance, quantifying its organic tissue elasticity and its evolution over time, which may vary for living elements) in the virtual scene a). As the virtual object 800 has no physical equivalent in the anatomy model of the physical environment setup (FIG. 8b), the proposed method may be applied to calculate and actuate, with the proposed simulator LEM arrangement of the trocar-like instrument hosting duct 130 and the instrument replicate 110, a kinesthetic force feedback 830 to mimic the manipulation of the virtual object 800 in the virtual scenario.

Figure 9:
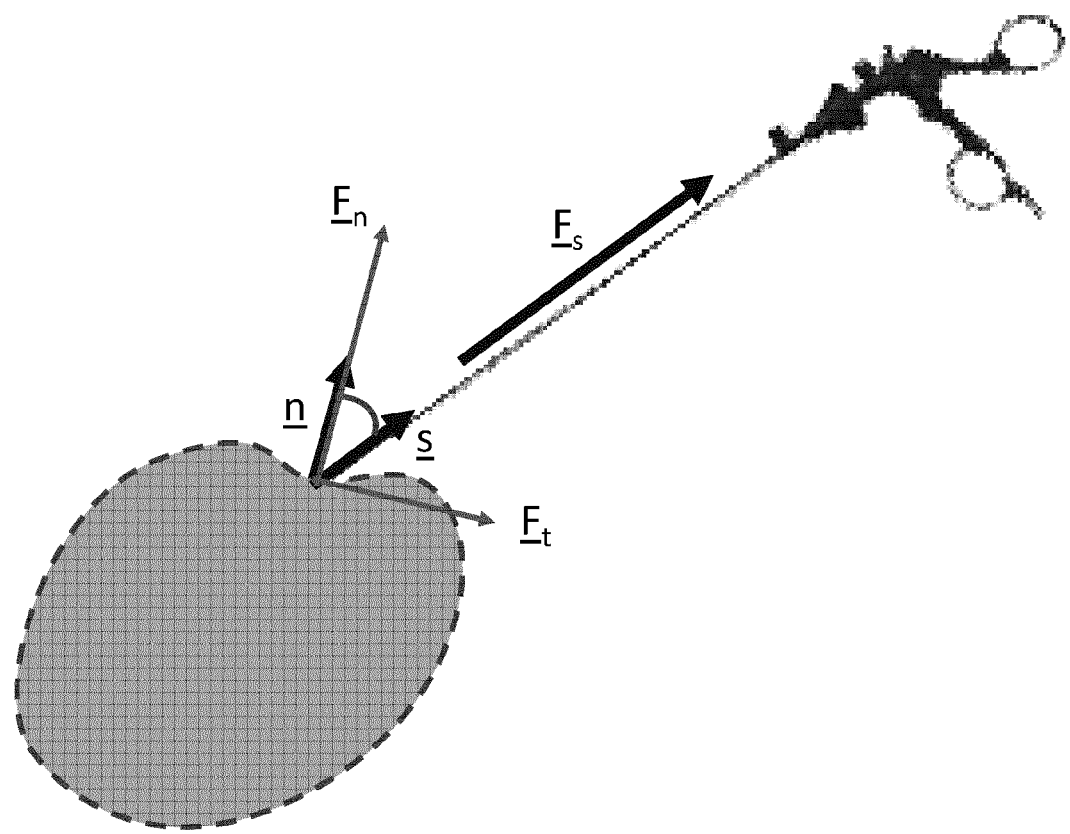
FIG. 9 illustrated a possible decomposition and projection of a calculated kinesthetic force along the instrument hosting duct axis.

In a possible embodiment, the mixed reality processing engine 650 may derive the deformation of the virtual object 800 according to the difference between the initial contact position at the virtual surface of the virtual object and orientation 801 pos1(t1) at a first time t1 of the virtual contact detection and the current deformed contact position and orientation 802 pos2(t2) at a second time t2 according to the manipulation of the physical instrument replicate by the trainee. The mixed reality processing engine 650 may thus calculate a theoretical contact force 810 $F_c$ at the contact points between the instrument and the virtual object and its projected force 820 $F_s$ in direction s along the instrument hosting duct 130 axis. The feedback force can also take into account the angle of contact between the tip of the instrument replicate and the virtual surface of the virtual object. This angle can change with the instrument replicate position according to the virtual deformation model of the virtual object. As illustrated by FIG. 9), the theoretical contact force $F_c$ at the contact point between the instrument and the virtual object consists of the sum of a force $F_s$ in shaft direction s and (perpendicular to that direction s) a lateral force $F_l$, so $F_c = F_s + F_l$. As in laparoscopy training, the instrument rod slides as smoothly as possible within the trocar hollow tube (so that the surgeon concentrates on feeling the manipulated organs, not the hardware of the manipulated tools), the lateral friction forces may be assumed neglectable for a number of virtual object manipulation scenarios, as well as the moments. As illustrated by FIG. 9), the mixed reality processing engine may thus calculate the projected force 820 $F_s$ in shaft direction unit vector s as:

$$F_s = (F_n + F_t)s \quad \text{(Eq. 1)}$$

where the $F_n$ is the normal force 810 at the contact point between the instrument and the virtual object, varying according to the deformation of the virtual object surface, and $F_t$ is the tangential force at the contact point between the instrument and the virtual object, varying according to the friction of the virtual object surface.

In a possible simple embodiment, the normal force 810 may be calculated as:

$$F_n = D$$

n with a material-dependent deformation scalar parameter D and the tangential force may be further calculated as:

$$F_t = |D_n|$$

with friction coefficient which might differentiate between static/sliding friction depending on tool velocity. In practice, for most medical scenarios to be simulated, the tangential force corresponding to surface friction may be neglected.

More generally, the magnitude of the calculated normal force $F_n$ 810 at the contact point between the instrument tip and the virtual object may thus vary over time upon the measured deformation (as a function of the virtual object position and orientation, as calculated by the mixed reality processing engine, and of the tracked position and orientation of the instrument replicate, as measured by the sensors) and at least one material property of the virtual object. In a possible embodiment, the mixed reality processing engine 650 may employ a mathematical solver (for instance a FEM solver, a Position-Based-Dynamics (PBD), a Projective Dynamics solver, a Gauss-Seidel solver, a Jacobi solver, and others) to calculate, with one or more processors, the collisions and deformations between the instrument and the virtual object in the virtual scenario to be simulated. The mixed reality processing engine 650 may calculate accordingly the theoretical reaction force 810 $F_c$ from the object contact and its projected force 820 $F_s$ corresponding to a physically realistic VR/AR scene.

Figure 10:
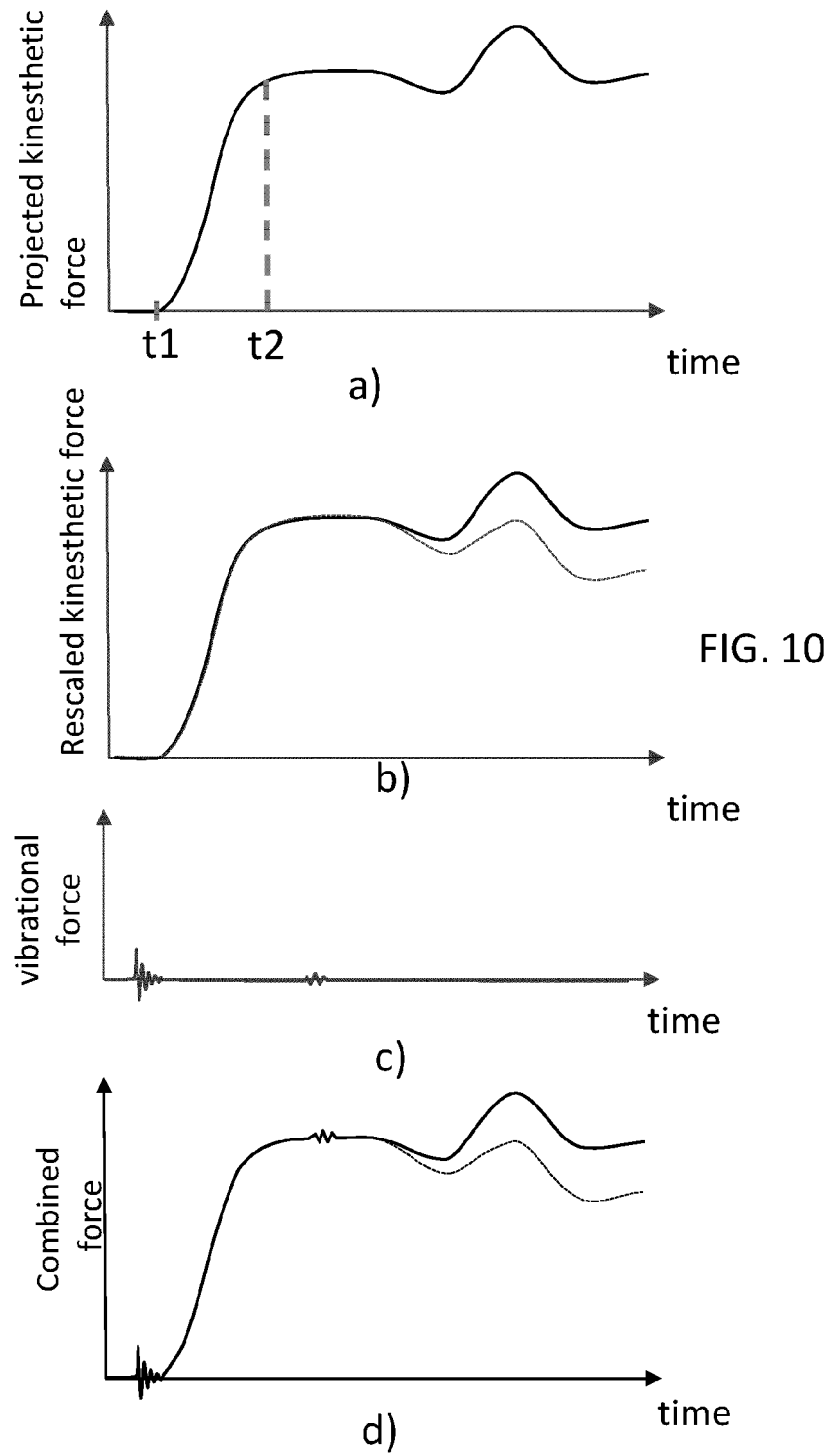
FIG. 10 illustrate different haptic feedback signals as may be produced by the proposed simulator system.

The mixed reality processing engine may then derive from the theoretical contact force 810 $F_c$ and its projected force 820 $F_s$ the variable axial force 830 to be applied to the instrument to render a haptic feedback to the end user. FIG. 10a) shows an exemplary kinesthetic force signal varying over time in magnitude as may be generated by the mixed reality processing engine 650. Until the instrument reaches a first contact with the virtual object surface at pos1 (t1), the applied force is null. Then, as the user pushes further the instrument to pos2(t2), thus deforming the virtual object, the calculated force feedback magnitude quickly increases to simulate the resistance of the virtual object to the deformation until it reaches a maximum. As the user further makes only minor adjustments to the position, a slowly variable force feedback may be applied.

Axial Force Feedback with Magnitude Rescaling

While the above described method may be sufficient to simulate, with the proposed LEM arrangement, an axial force feedback which is realistic enough for certain combinations of virtual object material properties and deformation forces primarily along the axis of the trocar-like instrument hosting duct, some more advanced scenarios may require a further adaptation of the axial force feedback for increased manipulation realism. One example is the simulation of the interaction of the instrument with certain organ surfaces requiring a more realistic simulation of friction forces, for instance when simulating the grasping of an elastic organ tissue with the grasper instrument replicate, by adapting a pulling force faking from the resistance to elongation of the virtual organ being grasped and pulled.

Indeed, as the proposed 1DOF LEM arrangement made of the instrument hosting duct 130 and the instrument replicate 110 can only actuate a simulated force $F_s^{sim}$ in the direction s of the instrument hosting shaft, the mixed reality processing engine 650 may further increase the simulation realism by resealing the calculated signal magnitude to calculate a more realistic actual force to actuate than the theoretical projected force $F_s$. In a possible embodiment, the mixed reality processing engine 650 may further adjust the magnitude of the simulated force signal $F_s^{sim}$ (830) to be transmitted and actuated by the haptic control engine 600 depending on the calculated theoretical lateral force $F_l$. For example, it may rescale the magnitude of the simulated force $F_s^{sim}$ depending on the magnitude of the lateral force $F_l$ in EQ. 1), with a material-dependent weighting scalar parameter w:

$$F_s^{sim}(t) = F_s(t) + w * F_l(t) \quad (Eq. 2)$$

In another possible embodiment, the mixed reality processing engine 650 may rescale the magnitude of the simulated force $F_s^{sim}$ depending on the magnitude of the lateral force $F_l$ by adjusting it with a material-dependent and time-dependent function w(t).

The mixed reality processing engine 650 may for instance increase the magnitude, to help with the training by driving/guiding the trainee to desired positions, and/or to enhance the haptic feedback from some local virtual object material properties, such as local tissue texture variations, or even physiological organ functions which may cause the virtual object deformation to vary over time such as the pulsation of a blood artery or the reflex contraction of the bowel muscle when irritated. The mixed reality processing engine 650 may also decrease the magnitude after the signal has reached a stabilized state, as illustrated for instance in FIG. 10*b*), for instance to increase the dynamic or adaptability of the LEM. The mixed reality processing engine 650 may also decrease the magnitude to prevent the overheating of the LEM coils without causing a noticeable haptic experience for the end user. In a possible embodiment, the MRPE or the Haptic Controller may selectively decrease the slowly varying part of the force feed-back signal to match the dynamics of the remaining part of the force feed-back signal within the dynamic range of the LEM.

The proposed LEM arrangement may also facilitate advanced control of the kinesthetic force feedback signal to actuate as the LEM inherently enables multiple drive modes. In a possible embodiment, the electrical phase angle between the LEM position and the LEM coils may be varied to apply different behaviors to the LEM, resulting haptic feedback of friction on-off, low viscosity, honey-like movement, and/or very fast almost self-going motion. In a further possible embodiment, a PID position controller can be implemented into the haptic control engine 600 to control the position of the LEM. The mixed reality processing engine 650 may accordingly command the haptic control engine 600 to hold a certain position, for instance as an example to guide a trainee.

Axial Force Feedback with Superposed Vibration

While the above described method may be sufficient to simulate, with the proposed LEM arrangement, a deformation-adaptive, kinesthetic, axial force feedback which is realistic enough for certain combinations of virtual object material properties and deformation forces primarily with relatively slow magnitude variation, some more advanced scenarios may require a higher variation of the axial force feedback signal in both frequency and magnitude for increased tactile manipulation realism. One example is the simulation of the collision of the instrument with certain organ surfaces requiring a more realistic simulation of the perceived collision shock, for instance when simulating the collision of the instrument with a rigid element. Another example is the slipping of an instrument over a surface, in which case vibrations can be used to render the surface roughness.

In a possible embodiment, the material property may be specified by material-dependent scalar parameters to calculate the amplitude signal as a decaying sinusoidal waveform linearly scaled with the incoming velocity, according to the reality-based model from Okamura et al., *Reality-based models for vibration feedback in virtual environments*, IEEE/SME Transactions on Mechatronics, Vol. 6, No. 3, September 2001, pp. 245-252:

$$a(t) = A(v) e^{-t} * \sin(2 f_{mat} * t) \quad (Eq. 3)$$

where A(v) is the amplitude as a material-dependent function of the impact velocity v, is the decay parameter, and $f_{mat}$ is the frequency. Okamura proposed to calculate A(v) as a linear relationship A(v)=s*v, where s is a material-dependent scalar parameter representing the amplitude slope. Exemplary vibration parameters proposed by Okamura for rubber are s=−116.7 s⁻¹, =40000 s¹ and $f_{mat}$=18 Hz, and for aluminum s=−100000 s¹, =1500000 s⁻¹ and $f_{mat}$=1153 Hz.

FIG. 10*c*) illustrates an exemplary signal with variable frequency as may be generated by the proposed mixed reality processing engine, first at the time of collision between the instrument and the virtual object, and later at the time of scratching the virtual object surface with the instrument.

While the Okamura haptic model has been applied to many virtual environments, both in combination with conventional force feedback and in event-based haptics where high-frequency force transients are added at the start of the contact, they have been primarily tested with 3DOF haptic interfaces such as the SensAble Phantom (Kuchenbecker et al. *Improving contact realism through event-based haptic feedback*, IEEE Trans. On Visualization and Computer Graphics, Vol. 12, No. 2, March/April 2006, pp. 219-230). For the proposed compact haptic simulator with 1DOF haptic interface capability, the kinesthetic force feedback (for instance, FIG. 10*a*) or its rescaled version of FIG. 10*b*) may be combined with the variable frequency signal (for instance, FIG. 10*c*) by the mixed reality engine 650 before it transmits the command to the haptic controller engine to power the coils accordingly. A conceptual view of an exemplary combination signal is pictured on FIG. 10*d*) (we note that, as will be apparent to those skilled in the art of haptic automation, in real signals, the timescale of the kinesthetic force feedback variations, which may be slower, and the timescale of the vibration signal frequency variations, which may be faster, may not be properly depicted by such a picture, which is shown here only for the sake of an explanatory illustration).

Additional Vibrotactile System Arrangements and Methods

While the above proposed simulator LEM arrangement and methods may be sufficient to simulate, with the proposed LEM arrangement, a deformation-adaptive, kinesthetic, axial force feedback sufficiently varying in magnitude and/or frequency to be realistic enough for many combinations of virtual object material properties and deformation forces, for certain advanced simulation scenarios the realism of the simulation scenario as perceived by the trainee may be further improved by augmenting the proposed simulator with at least one vibrotactile actuator to produce additional, non-directional haptic signals, in particular for a more accurate simulation of collisions and grasping/scratching a diversity of deformable organ surfaces, or even for mimicking of rotational tactile events (e.g. when rotating a needle driver). The vibrotactile actuator may be an ERM, an LRA, a piezoelectric or a solenoid vibro-motor. In a possible embodiment, it may be solenoid based with a frequency range of 0 to 500 Hz. For instance, a vibro-motor circuit from Tactile Labs or Lofelt may be used, but other arrangements are also possible.

In a possible embodiment, a vibrotactile actuator may be attached to the instrument replicate. Preferably it is positioned such that the end user does not notice it and such that the vibrotactile signal is strong enough to be perceived by the hand manipulating the instrument. In a possible embodiment, the vibrotactile actuator may be placed on or near the instrument main handle, but other embodiments are also possible. In an alternate embodiment, the vibrotactile actuator may also be placed on the trocar-like instrument hosting duct 130.

Figure 11:
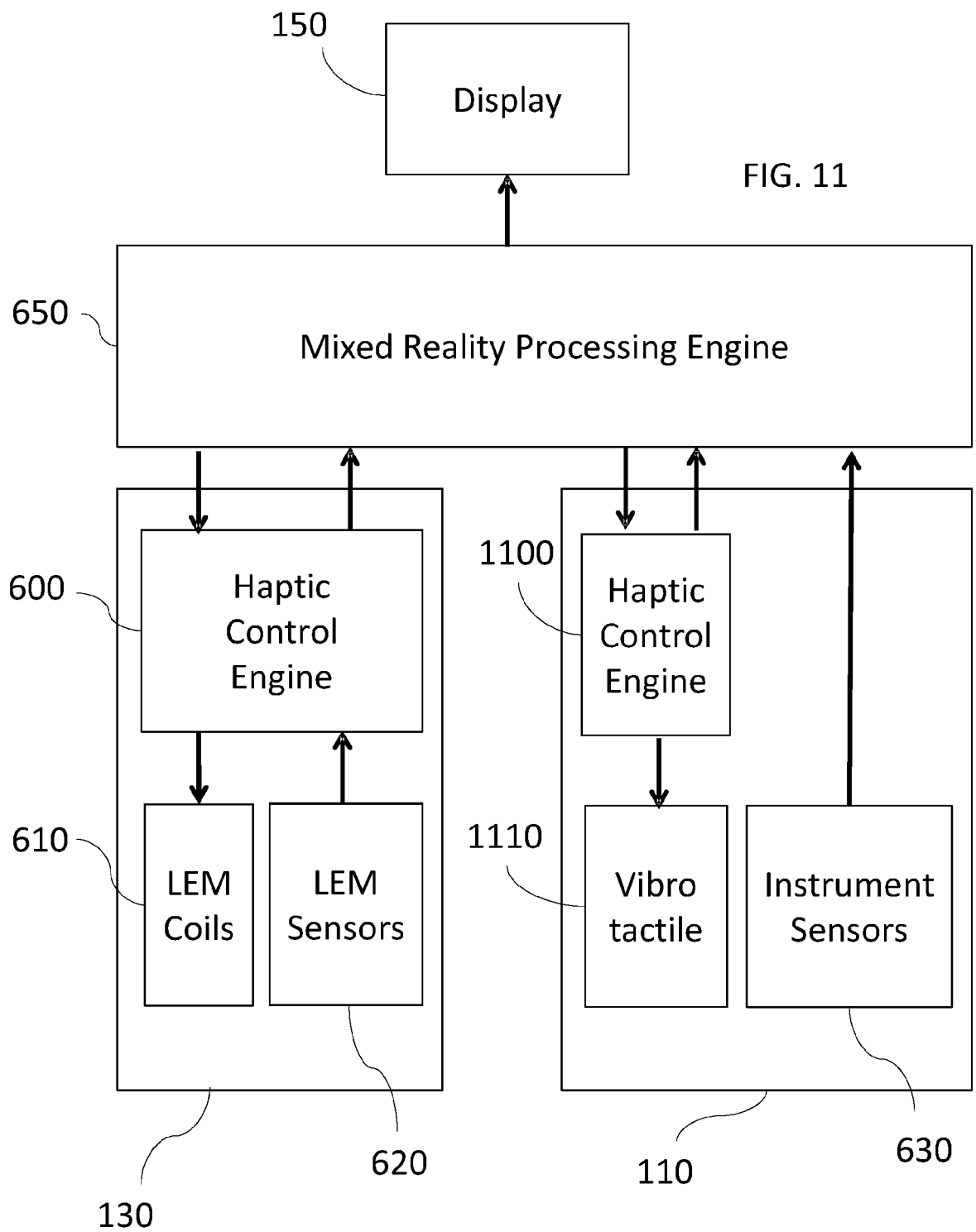
FIG. 11 illustrates a further possible embodiment of the proposed simulator combining a linear electro-magnetic (LEM) motor arrangement with a separate vibrotactile actuator.

FIG. 11 shows a possible extension of the proposed simulator system of FIG. 6 where a secondary haptic control engine 1100 may be appended to at least one instrument 110, so as to control a vibrotactile actuator 1110 and possibly also the sensor(s) 630 associated with this instrument 110. The mixed reality processing engine 650 may thus calculate both:
- a kinesthetic haptic force feedback command for the primary haptic control engine circuit 600 to power the EM arrangement formed by the instrument replicate 110 and the instrument hosting duct 130, for instance in accordance with the calculated signal of FIG. 10b), and
- a vibrotactile haptic command for the secondary haptic control engine circuit 1100 to power the instrument vibrotactile actuator 1110 on the instrument 110, for instance in accordance with the calculated signal of FIG. 10c).

The mixed reality processing engine may thus jointly adapt the calculation of the variable kinesthetic haptic force feedback signal and/or the calculation of the vibrotactile haptic command to produce the most realistic combined haptic effect as will be perceived by the trainee operating the simulator system.

In a possible embodiment, the haptic control engine circuit 1100 and the vibrotactile actuator 1110 may be separate components. In an alternate possible embodiment, they may be integrated into the same small circuit to facilitate a compact integration for instance on the instrument handle.

Axial Force Feedback with Space Warping Rendering

While the above described methods may be sufficient to simulate, with the proposed LEM arrangement and possibly with further vibrotactile actuators, a haptic feedback which is realistic enough for many combinations of virtual object material properties and deformation forces, the realism of the simulation scenario as perceived by the trainee may be further improved by further adapting the haptic signals to take into account not only the haptic perception, but also the hand-eye coordination and visual dominance of most humans.

Therefore, in a further possible embodiment, the proposed simulator may also integrate the augmented reality setup and mixed reality space warping methods. As described for instance in U.S. Pat. No. 9,330,502, the mixed reality processing engine 650 may apply the space warping methods of Kohli according to a mixed reality scenario parameter, such as a material property of the virtual object to be rendered and/or the surrounding objects in the simulation scenario, to render on the display 150 a virtual scene with different object geometries compared to their physical setup counterparts, so as to redirect the touching from the virtual object surface without physical counterpart (for instance, the knee meniscus) to a real object surface which exist in the physical simulator setup (for instance, the femur bone). In a possible embodiment, for certain simulation scenario events, the mixed reality processing engine 650 may determine, from the tracked position and orientation of the instrument replicate handheld tool 110 and the virtual object position, orientation and material property (for instance, identifying a rigid surface) that passive haptic retargeting may be applicable with better perceived manipulation realism as a replacement and/or a complement to the active haptic signal commands to the proposed simulator active haptics force and/or vibrotactile actuations.

In a possible embodiment, the mixed reality processing engine may further balance the space warping visual tricking, the force resealing force feedback tricking and/or the vibrotactile effect tricking to maximize the realism of the simulation and to facilitate the end user to reach the training objectives.

Exemplary Application to Laparoscopy Simulation—Advantages Over the Prior Art

As will be apparent to those skilled in the art of haptic simulation, even if the proposed compact simulator arrangement is only capable of single 1DOF haptic force feedback actuation, with the proposed novel embodiments disclosed herein, increased training functionality may be achieved compared to prior art bulky medical simulator systems, while significantly facilitating the setup, operation and maintenance of a multi-purpose medical staff training room.

Various medical scenarios may be simulated using the above method, for instance:
1. Collision with an organ tissue: zero signal until collision, then a decaying short vibration shock, in combination with a linear kinesthetic resistance increasing then stabilizing along the linear axis direction;
2. Grasping an elastic organ wall: zero signal until collision, then a linear kinesthetic resistance increasing with the tissue elongation and followed by a possible vibration faking the tearing of a tissue layer or the detaching of a thin tissue layer from an organ.
3. Sliding along an organ tissue wall (for instance, the bladder side): no signal until collision and then a vibrational signal modulated in magnitude according to the pressure of the instrument tip on the tissue, and in frequency according to the surface texture and the velocity of the sliding motion on the organ tissue.

Compared to the prior art, the proposed novel embodiments disclosed herein further provide a number of additional advantages in facilitating the medical training operations, such as:
supporting a free placement of portals;
instruments are freely removable from the training system as in real life;
enabling a more realistic friction-less setup of the actuator compared to prior art simulators, resulting in a more realistic handling of the instruments;
thanks to the presence of position sensors on the instruments, a more accurate force feedback actuation can be controlled to not create any vibration or similar artifacts as observed in many of the prior art systems.

OTHER EMBODIMENTS AND APPLICATIONS

While various embodiments of an exemplary laparoscopy simulator have been described herein, it should be understood that they have been presented by way of example and not limitation. It will be apparent to persons skilled in the relevant art(s) that the proposed simulators, adapted anatomy models, adapted instruments and virtual reality simulation systems can be generalized to any type of medical and surgical simulation applications using imaging instruments and not just laparoscopy, such as thoracoscopy, anoscopy, coloscopy, transanal endoscopy, transvaginal endoscopy, neurosurgery, needle insertion procedures and others, in human medicine as well as veterinary practice. Various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

While the exemplary laparoscopy simulator has been described with one portal per trocar as depicted by FIG. 1, FIG. 2a) and FIG. 2b), FIG. 3a) and FIG. 3b), it will be apparent to those skilled in the art that the proposed systems and arrangements are not limited to such a configuration. For instance they may also apply to the simulation of multiple access single port emerging laparoscopy procedures, for instance using the SILS™ port from Medtronics Covidien (http://www.medtronic.com/covidien/en-us/products/trocars-access/single-incision-transanal-surgery.html) and more generally triport or quadraport laparoscopy simulation where three to four trocars may be inserted from a single port.

While the exemplary LEM arrangement has been primarily described with the trocar adapted as the stator and the elongated instrument adapted as the rotor of the linear electromagnetic motor, the reverse configuration is also possible. This would then lead into a passive trocar only holding the permanent magnets, without the need for cable wires on the trocar-like instrument hosting duct, while the haptic control engine would be associated with the instrument replicate.

While the exemplary surgical simulation methods have been detailed herein in the context of medical anatomy simulators for training surgeons, the proposed methods may be more generally applicable to any VR/AR procedure wherein an instrument is inserted through a physical simulator portal primarily along a linear axis. Throughout this disclosure, the terminology space warping is thus used to refer to the remapping, for VR rendering, of a virtual reality scene coordinates to the actual physical simulator object geometries. Space warping methods may thus produce a modification of one or more of a theoretical position coordinate, orientation coordinate and deformation direction of a virtual scene object or instrument calculated by the mixed reality processing engine according to the VR/AR scenario to be simulated before rendering it for visualization by the end user on the VR/AR simulator display. As will be familiar to those skilled in the art of mixed reality, the space warping terminology should not be limited to the exemplary embodiments as described throughout this disclosure and/or in U.S. Pat. No. 9,330,502, but may more generally include haptic retargeting or redirected touching methods derived from Kohli s research works (Culbertson et al., *Haptics: the present and future of artificial touch sensation*, in Annual Review of Control, Robotics and Autonomous Systems, 2018. 1:385-409).

While the mixed reality processing engine signal calculation methods have been primarily described with exemplary force feedback models and methods, the latter may be further combined with complementary models to better account for the physics of the simulator setup and/or the virtual physiology medical scenario. In a possible embodiment, the temperature sensor 620 may report the measurement to the haptic control engine 600 and/or the mixed reality processing engine 650. A thermal model may then be calculated in real time by the haptic control engine 600 and/or the mixed reality processing engine 650, which may then adapt the powering signal transmitted back through the haptic control engine 600 amplifier so as to avoid the LEM coils 610 from overheating. Other embodiments are also possible.

While the user sensory interaction has been primarily described with a combination of haptic force feedback with the LEM arrangement and visual rendering on the simulator display, the proposed simulator may further employ additional stimuli for the same or other sensory modalities, such as additional LED lights as warning or status information, vibration alerts which may be generated with the proposed LEM coils 610 or vibrotactile arrangement 1010 or with additional tactile devices; and/or audio feedback signals. In a possible embodiment, audio feedback may be calculated by the mixed reality processing engine 650, sent to the haptic control engine 600, and played on the LEM stator coils 610.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase hardware module should be understood to encompass a tangible entity, be that an entity that is physically constructed, permanently configured (e.g., hardwired), or temporarily configured (e.g., programmed) to operate in a certain manner or to perform certain operations described herein. As used herein, hardware-implemented module refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, processor-implemented module refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an algorithm is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as data, content, bits, values, elements, symbols, characters, terms, numbers, numerals, or the like. These words, however, are merely convenient labels and are to be associated with appropriate physical quantities.

In addition, it should be understood that any figures which highlight the functionality and advantages are presented for example purposes only. The disclosed methodology and system are each sufficiently flexible and configurable such that they may be utilized in ways other than that shown.

Although the term at least one may often be used in the specification, claims and drawings, the terms a, an, the, said, etc. also signify at least one or the at least one in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method to simulate a medical procedure scenario for at least one operator interacting with a medical simulator anatomy model, said anatomy model being mounted on a rotational element allowing for a change in an orientation of the anatomy model, the method comprising:
    detecting an orientation of the anatomy model;
    detecting a position of a virtual object into the medical procedure scenario, said virtual object having at least one material and/or physical property parameter and a virtual deformation model;
    updating the position, deformation model and material and/or physical property of the at least one virtual object according to the orientation of the anatomy model;
    acquiring a position and orientation from at least one instrument replicate manipulated by the operator, the instrument replicate being adapted to slide into an instrument hosting duct mounted on a portal entry of the anatomy model, said instrument hosting duct and said instrument replicate forming a linear electromagnetic motor;
    detecting a virtual contact between the acquired position of the instrument replicate and the updated virtual object position in the medical procedure scenario, the virtual contact causing a virtual deformation of the virtual object in the medical procedure scenario according to the updated virtual deformation model of the virtual object;
    calculating an axial force feedback signal to haptically render the interaction between the virtual object and the instrument replicate, the magnitude of the axial force feedback signal being a function of the virtual object position, the updated virtual object deformation model, the updated virtual object material and/or physical property parameters, as well as of the position and orientation of the instrument replicate;
    transmitting the calculated variable axial force feedback signal to a controller of the linear electromagnetic motor so as to produce an axial force along the instrument hosting duct axis.

2. The method of claim 1, wherein the virtual object has a virtual object surface, the method further comprising determining a contact angle between the position and orientation of the instrument replicate and an updated virtual object surface, and wherein the magnitude of the axial force feedback signal is further calculated as a function of said angle of contact.

3. The method of claim 1, further comprising:
    identifying that the calculated axial force feedback signal is not sufficient for realistic haptic rendering of the interaction between the virtual object and the instrument replicate; and
    increasing the magnitude of the axial force feedback to augment the haptic rendering depending on the position and orientation of the instrument replicate manipulated by the operator.

4. The method of claim 1, further comprising:
    calculating a vibration signal to augment the haptic rendering, the vibration signal varying over time in magnitude and/or frequency as a function of the updated virtual object position, deformation model, material and/or physical property parameter, and of the acquired position and orientation of the instrument replicate; and transmitting the calculated vibration signal to the controller of the linear electromagnetic motor so as to control an oscillating component of the linear electromagnetic motor formed by the instrument replicate (110) and the instrument hosting duct.

5. The method of claim 1, further comprising:

calculating a vibrotactile signal to augment the haptic rendering, the vibrotactile signal varying over time in magnitude and/or frequency as a function of the updated virtual object position, deformation model, material and/or physical property parameter, and of the acquired position and orientation of the instrument replicate; and transmitting the calculated vibrotactile signal to a controller of a vibrotactile actuator mounted on the instrument replicate.

6. The method of claim 1, further comprising:

identifying that the calculated axial force feedback signal is not sufficient for realistic haptic rendering of the interaction between the virtual object and the instrument replicate;

calculating a redirected position for the virtual object in the medical procedure scenario, the redirected position being different from the initially identified position;

rendering, on a display, the virtual object at the calculated redirected position; and adapting the magnitude of the axial force feedback signal depending on redirected position for the virtual object.

7. The method of claim 1, further comprising:

identifying that the calculated axial force feedback signal has reached a stabilized state; and decreasing the magnitude of the axial force feedback to extend the dynamic of the linear electromagnetic motor.

8. The method of claim 1, further comprising:

identifying that the calculated axial force feedback signal may overheat the linear electromagnetic motor; and decreasing the magnitude of the axial force feedback to prevent the overheating of the linear electromagnetic motor.

9. The method of claim 1, wherein the anatomy model comprises a plurality of portal entries, the method further comprising:

detecting, with an instrument hosting duct sensor, the insertion of the instrument replicate into the instrument hosting duct;

identifying, from the acquired position and orientation of the instrument replicate, the position of the portal entry onto which the instrument hosting duct is mounted; and identifying the updated position of a virtual object into the medical procedure scenario to simulate in accordance with the position of the medical procedure portal entry through which the instrument replicate slides into the instrument hosting duct.

10. The method of claim 1, wherein the magnitude of the variable force feedback signal is null until the acquired position of an instrument replicate tip is detected out of the instrument hosting duct.

11. A medical simulation system comprising:

an anatomy model with at least one portal entry, said anatomy model being mounted on a rotational element allowing for a change in an orientation of the anatomy model;

an instrument hosting duct mounted on the portal entry;

an instrument replicate adapted to slide into the instrument hosting duct;

at least one instrument position tracking system to track the instrument replicate position and orientation;

a mixed reality processor engine; and a haptic controller;

wherein said instrument hosting duct and said instrument replicate are arranged to form together a linear electromagnetic motor; and wherein the mixed reality processor engine is configured to:

a. acquire, with the instrument's position tracking system, a position and orientation of the instrument replicate;

b. acquire an orientation of the anatomy model;

c. update by the mixed reality engine, a position, deformation model and material and/or physical property of the at least one virtual object according to the orientation of the anatomy model;

d. detect a virtual contact between the acquired position and orientation of the instrument replicate and the updated virtual object position and orientation in a medical procedure scenario, the virtual contact causing a virtual deformation of the virtual object in the medical procedure scenario according to the virtual deformation model of the virtual object;

e. calculate an axial force feedback signal to haptically render an interaction between the virtual object and the instrument replicate, a magnitude of the axial force feedback signal being a function of the updated virtual object position, deformation model, material and/or physical property parameter, as well as of a position and orientation of the instrument replicate; and f. transmit to the haptic controller the calculated variable axial force feedback signal, said haptic controller controlling the linear electromagnetic motor so as to produce an axial force along the instrument hosting duct axis.

12. The system of claim 11, wherein the linear electromagnetic motor further comprises an oscillating component designed to generate a haptic vibration, said mixed reality engine is configured to:

calculate a vibration signal to augment the haptic rendering, the vibration signal varying over time in magnitude and/or frequency as a function of the virtual object position, deformation model, material and/or physical property parameter, and of the acquired position and orientation of the instrument replicate; and transmit the calculated vibration signal to a controller of the oscillating component of the linear electromagnetic motor.

13. The system of claim 11, wherein the instrument replicate further comprises a vibrotactile actuator mounted on the instrument replicate and designed to generate a haptic vibration, said mixed reality engine is adapted to:

calculate a vibrotactile signal to augment the haptic rendering, the vibrotactile signal varying over time in magnitude and/or frequency as a function of the virtual object position, deformation model, material and/or physical property parameter, and of the acquired position and orientation of the instrument replicate; and transmit the calculated vibrotactile signal to a controller of the vibrotactile actuator of the instrument replicate (110).

14. The system of claim 11, wherein the sensor is located at a tip of the instrument replicate.

15. The system of claim 11, wherein the instrument hosting duct further comprises an insertion sensor, said insertion sensor informing the mixed reality engine of the insertion of the instrument replicate.

\* \* \* \* \*